US008768812B2

(12) United States Patent
Mathews et al.

(10) Patent No.: US 8,768,812 B2
(45) Date of Patent: Jul. 1, 2014

(54) SYSTEM, METHOD AND COMPUTER-READABLE STORAGE MEDIUM FOR VALUING A PERFORMANCE OPTION

(75) Inventors: Scott H. Mathews, Seattle, WA (US); Jacomo Corbo, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 13/099,020

(22) Filed: May 2, 2011

(65) Prior Publication Data

US 2012/0284204 A1     Nov. 8, 2012

(51) Int. Cl.
*G06Q 40/04* (2012.01)

(52) U.S. Cl.
USPC ............... 705/36 R; 705/4; 705/7.25; 705/35

(58) Field of Classification Search
None
See application file for complete search history.

(56) References Cited

U.S. PATENT DOCUMENTS

| | | | |
|---|---|---|---|
| 5,377,095 A | 12/1994 | Maeda et al. | |
| 5,692,233 A | 11/1997 | Garman | |
| 5,710,578 A | 1/1998 | Beauregard et al. | |
| 5,960,407 A | 9/1999 | Vivona | |
| 6,061,662 A | 5/2000 | Makivic | |
| 6,078,893 A | 6/2000 | Ouimet et al. | |
| 6,078,901 A | 6/2000 | Ching | |
| 6,157,918 A | 12/2000 | Shepherd | |
| 6,205,431 B1 | 3/2001 | Willemain et al. | |
| 6,321,205 B1 | 11/2001 | Eder | |
| 6,321,212 B1 | 11/2001 | Lange | |
| 6,381,586 B1 | 4/2002 | Glasserman et al. | |
| 6,393,406 B1 | 5/2002 | Eder | |
| 6,578,016 B1 | 6/2003 | Trankina et al. | |
| 6,629,082 B1 | 9/2003 | Hambrecht et al. | |
| 6,810,332 B2 | 10/2004 | Harrison | |
| 6,853,952 B2 | 2/2005 | Chadwick | |
| 6,862,579 B2 | 3/2005 | Mathews et al. | |

(Continued)

FOREIGN PATENT DOCUMENTS

| | | | |
|---|---|---|---|
| EP | 1 178 416 A1 | 2/2002 | |
| JP | 2001357189 A | 12/2001 | |
| WO | WO 03/007106 | * 1/2003 | |

OTHER PUBLICATIONS

Zhang et al (Design and Evaluation of a Business Information Visualization system for Manufacturing Production Planning Support), May 1996, Proceedings of Informs First Conference on Information Systems and Technology, pp. 1-8.*

(Continued)

*Primary Examiner* — Robert Niquette
(74) *Attorney, Agent, or Firm* — Alston & Bird LLP

(57) ABSTRACT

A system is provided that includes a plurality of modules. The system includes modules configured to determine a present value distribution of contingent positive utility attributable to commitment resources to an asset at a subsequent time, and a present value of a contingent negative utility required to make the resource commitment or deviate from a resource commitment to a known alternative asset. The modules are configured to determine the distribution of contingent positive utility based upon first parameters that reflect risk in the positive utility, and determine the contingent negative utility based upon second parameters that reflect risk in the negative utility. The system also includes a module configured to determine a value of an option to commit the resources based on the distribution of contingent positive utility and the contingent negative utility.

27 Claims, 9 Drawing Sheets

(56) References Cited

U.S. PATENT DOCUMENTS

| | | |
|---|---|---|
| 6,910,017 B1 | 6/2005 | Woo et al. |
| 6,963,854 B1 | 11/2005 | Boyd et al. |
| 7,085,734 B2 | 8/2006 | Grant et al. |
| 7,110,956 B1 | 9/2006 | Drake et al. |
| 7,133,848 B2 | 11/2006 | Phillips et al. |
| 7,197,474 B1 | 3/2007 | Kitts |
| 7,206,755 B1 | 4/2007 | Muralidhar |
| 7,315,842 B1 | 1/2008 | Wang |
| 7,349,878 B1 | 3/2008 | Makivic |
| 7,363,267 B1 | 4/2008 | Vincent et al. |
| 7,398,221 B1 * | 7/2008 | Bensoussan et al. ........ 705/7.25 |
| 7,574,394 B2 | 8/2009 | Chorna et al. |
| 7,627,495 B2 | 12/2009 | Mathews et al. |
| 7,739,166 B2 | 6/2010 | Mathews et al. |
| 2001/0034686 A1 | 10/2001 | Eder |
| 2001/0041996 A1 | 11/2001 | Eder |
| 2002/0010667 A1 * | 1/2002 | Kant et al. ..................... 705/35 |
| 2002/0065755 A1 | 5/2002 | Shlafman et al. |
| 2002/0116348 A1 | 8/2002 | Phillips et al. |
| 2002/0143604 A1 | 10/2002 | Cox et al. |
| 2003/0014337 A1 | 1/2003 | Mathews et al. |
| 2003/0033154 A1 | 2/2003 | Hajdukiewicz et al. |
| 2003/0033191 A1 | 2/2003 | Davies et al. |
| 2003/0078870 A1 * | 4/2003 | Datar et al. ..................... 705/36 |
| 2003/0115128 A1 | 6/2003 | Lange et al. |
| 2003/0144897 A1 | 7/2003 | Burruss et al. |
| 2003/0236738 A1 | 12/2003 | Lange et al. |
| 2004/0068455 A1 | 4/2004 | Jacobus et al. |
| 2004/0098327 A1 | 5/2004 | Seaman |
| 2004/0128221 A1 | 7/2004 | Pandher |
| 2004/0249642 A1 | 12/2004 | Mathews et al. |
| 2005/0102213 A1 | 5/2005 | Savasoglu et al. |
| 2005/0125318 A1 | 6/2005 | Jameson |
| 2005/0273379 A1 | 12/2005 | Mathews et al. |
| 2006/0253355 A1 | 11/2006 | Shalen |
| 2007/0011065 A1 | 1/2007 | Sreenivasan et al. |
| 2007/0022031 A1 | 1/2007 | Sponholtz et al. |
| 2007/0050282 A1 | 3/2007 | Chen et al. |
| 2007/0106576 A1 | 5/2007 | Jung et al. |
| 2007/0112661 A1 | 5/2007 | Mathews |
| 2007/0150390 A1 | 6/2007 | Mathews et al. |
| 2007/0150391 A1 | 6/2007 | Mathews et al. |
| 2007/0150392 A1 | 6/2007 | Mathews et al. |
| 2007/0150393 A1 | 6/2007 | Mathews et al. |
| 2007/0150394 A1 | 6/2007 | Mathews et al. |
| 2007/0150395 A1 * | 6/2007 | Nakamoto et al. .......... 705/36 R |
| 2007/0162376 A1 | 7/2007 | Mathews et al. |
| 2007/0299753 A1 | 12/2007 | Averbuch et al. |
| 2008/0015871 A1 | 1/2008 | Eder |
| 2008/0109341 A1 | 5/2008 | Stiff et al. |
| 2008/0147568 A1 | 6/2008 | Wang |
| 2008/0167984 A1 | 7/2008 | Courey et al. |
| 2008/0208678 A1 | 8/2008 | Walser et al. |
| 2008/0228605 A1 | 9/2008 | Wang |
| 2008/0288394 A1 | 11/2008 | Eder |
| 2009/0030822 A1 | 1/2009 | Cresswell |
| 2009/0043604 A1 | 2/2009 | Jung et al. |
| 2009/0043683 A1 | 2/2009 | Jung et al. |
| 2009/0099955 A1 | 4/2009 | Peters et al. |
| 2012/0143631 A1 * | 6/2012 | Ziade et al. ..................... 705/4 |

OTHER PUBLICATIONS

Eric L. Burgess, Hany S. Gobrieal; *Integrating Spacecraft Design and Cost-Risk Analysis Using NASA Technology Readiness Levels*; Feb. 1996; 29th Annual DoD Cost Analysis Symposium, Leesburg, Virginia; 14 pages; The Aerospace Corporation; Herndon, Virginia.
Ray Nelson; Risk Analysis Using @RISK® and Crystal Ball®; *Oracle of IIF*; Dec. 2000; pp. 8-11.
John M. Charnes; Using Simulation for Option Pricing; Dec. 2000; pp. 151-157; *Proceedings of the 2000 Winter Simulation Conference*, Orlando, Florida.
*Risk Analysis Overview—What is Risk?*; Available at <http://www.decisioneering.com/risk-analysis-print.html> (visited Feb. 19, 2002).
*Real Options with Monte Carlo Simulation*; Available at <http://www.puc-rio.br/marco.ind/monte-carlo.html> (visited Feb. 25, 2002).
*Cone of Uncertainty*; Available at <http://www.real-options.com/cou.html> (visited Oct. 11, 2002).
Weston Copeland; *Managerial Finance*; 1990; pp. 481-487, 406-407, 642 (10 pages); 9$^{th}$ Edition; ISBN 0 03 0558832.
Alan Shapiro; *Modern Corporate Finance*; 1990; pp. 438, 261; ISBN 002409530-3.
Felstead, "A Mathematical Approach to Cost Minimization of Satcom Systems", 1996, IEEE, pp. 352-356.
Morrison, "Life Cycle Approach to New Product Forecasting", Summer 1995, *The Journal of Business Forecasting Methods & Systems*, 14, 2, ABI/INFORM Global, p. 3.
Eskin, "Dynamic Forecast of New Product Demand Using a Depth of Repeat Model", May 1973, *JMR Journal of Marketing Research*, 10, 0000002, AB/INFORM Global, p. 115.
Bassin, "The Logistic Curve—another approach to new product forecasting", Fall 1991, *The Journal of Business Forecasting Methods & Systems*, 10, 3, ABI/INFORM Global, p. 14.
Paszko et al., "Product Life Cycles and Profitability", Summer 1989, *The Journal of Business Forecasting Methods & Systems*, 8,2; ABI/INFORM Global, p. 26.
Nelson, "The Product Life Cycle of Engineered Metals: a comparative analysis of the application of product life cycle theory", Spring 1992, *The Journal of Business & Industrial Marketing*, 7, 2, ABI/INFORM Global, p. 5.
Curry, "FALCCM-H: Functional Avionics Life Cycle Cost Model for Hardware", © 1993, IEEE, pp. 950-953.
Xie et al., "Probabilistic Design Optimization of Aircraft Structures with Reliability, Manufacturability, and Cost Constraints", Apr. 7-10, 2003, 44$^{th}$ AIAA/ASME/ASCE/AHS Structures, Structural Dynamics, and Materials Conference, Norfolk, VA, p. 1.
Marx et al., "Knowledge-based manufacturing and structural design for a high speed civil transport", 1994, 1$^{st}$ Industry / Academy Symposium on Research for Future Supersonic and Hypersonic Vehicles, Greensboro, NC pp. 1-6.
Schrage, "Technology for Rotorcraft Affordability Through Integrated Product/Process Development (IPPD)", 1999, American Helicopter Society 55$^{th}$ Annual Forum, Montreal, Canada, pp. 1-19.
Kamath et al., T.P.M. (2002) A Bayesian approach to a dynamic inventory model under an unknown demand distribution. Computers & Operations Research, v. 29, pp. 403-422.
Hirschleifer (1980) Price Theory and Applications. Prentice-Hall: New York, pp. 126-151.
Morris (1992) Market Oriented Pricing. Quarom Books: New York, pp. 172-173.
Evans and Berman (1992). Marketing. Macmillan: New York. Chapter 18: Overview of Price Planning, pp. 526-547.
Berry et al., Automobile Prices in Market Equilibria. Econometrica, vol. 63, No. 4 (Jul. 1995), pp. 841-890.
Monroe, (1978) Models for Pricing Decisions, *Journal of Marketing Research*, vol. XV (August), pp. 413-428.
Urban et al., (1968) A New Product Analysis and Decision Model, *Management Science*, vol. 14, No. 8 (April), pp. B490-B519.
Yang et al. (2003) Bayesian Analysis of Simultaneous Demand and Supply, Quantitative Marketing and Economics, vol. 1, pp. 251-275.
Largent, "A probabilistic risk management based process for planning and management of technology development", PhD Dissertation Georgia Tech Aerospace Engineering, Mar. 2003, downloaded Sep. 3, 2008 [retrieved from http://smartech.gatech.edu/handle/1853/12168], pp. 1-79, 210-271.
Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.
Macmillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

(56) References Cited

OTHER PUBLICATIONS

Longstaff, et al., "Valuing American Options by Simulation: A Simple Least-Squares Approach", Anderson Graduate School of Management, eScholarship Repository, University of California, http://repositories.cdlib.org/anderson/fin/1-01, 2001.

Breeden et al., "Prices of State Contingent Claims Implicit in Options Prices", *Journal of Business*, vol. 51, No. 4, pp. 621-651 (Oct. 1978).

Ghanem, Ph.D., et al., ,,utility Assessment Model for Wireless Technology in Construction (8 pgs.).

* cited by examiner

SYSTEM, METHOD AND COMPUTER-READABLE STORAGE MEDIUM FOR VALUING A PERFORMANCE OPTION

TECHNOLOGICAL FIELD

Example embodiments of the present invention generally relate to valuing performance of a non-financial asset to guide decision-making with respect to the asset, and more particularly relates to valuing the future performance of a non-financial asset subject to uncertainty or risk.

BACKGROUND

It is oftentimes desirable to determine the value of a contingent claim that may be exercised at some time in the future. While contingent claims frequently occur in the financial arena, contingent claims also arise in a number of other, non-financial contexts in which the benefit and/or cost of an asset may not be traditionally monetary. As an example, a contingent claim may come in the form of an option or opportunity to make a resource commitment that may or may not have a long-term beneficial payoff, such as an investment in new technology to improve the performance, capability or characteristics of a new good, service, event or the like. This type of option may be referred to as a performance option.

Unfortunately, the contingent claims that arise in these non-financial contexts may be more difficult to evaluate than the contingent claims that arise in the financial context since the underlying assets in these other contexts are not traded or valued by a well established market, such as the stock market in the financial arena. Furthermore, valuing the contingent claim is subject to the risk perception of the participant. The risk perception arises when the participant anticipates receiving less, or more, from the original investment than could be expected based a risk-neutral evaluation of the circumstances. The adjustment for risk perception subtly changes the value, or worth, of the contingent claim to the participant such that the participant is only willing to invest or commit resources up to and including a risk-adjusted amount for the contingent claim.

Regardless of the type of contingent claim, it may be desirable to determine the risk-adjusted, perceived value of an asset, and in particular the value of the contingent claim, at the present time. By determining the value of the contingent claim, the participant can avoid overpaying for the asset as a result of an overvaluation of the contingent claim. Conversely, the participant can identify projects or assets in which the value of the contingent claim has been undervalued and can give strong consideration to investing in these projects or assets since they likely represent worthwhile investment opportunities. And although techniques have been developed for determining the value of a project or an asset having a contingent claim at one or more subsequent times, it is usually desirable to improve upon existing techniques.

SUMMARY

In view of the foregoing, example embodiments of the present invention provide a system, method and computer-readable storage medium for valuing performance of an asset. According to one aspect, a system for performing a performance-option valuation is provided. The system includes a plurality of modules configured to perform a plurality of operations. The modules and operations include a utility distribution module configured to determine a present value distribution of contingent future positive utility attributable to making a resource commitment to a particular asset at a subsequent time, and a cost distribution module configured to determine a present value of a contingent future negative utility required to make the resource commitment at the subsequent time or deviate from a resource commitment to a known alternative asset. The modules and operations also include a payoff determinator or performance option valuation module configured to determine a value of an option to make the resource commitment as a function of the present value distribution of contingent future positive utility and the present value of the contingent future negative utility.

In one example, the system may include the performance option valuation module, and in this example, the performance option valuation module may be configured to determine the value of the option as an average of the difference between the present value distribution of contingent future positive utility and the present value of the contingent future negative utility. In one example, the performance option valuation module may be configured to limit the difference between the present value distribution of contingent future positive utility and the present value of the contingent future negative utility, where the difference may be limited to a minimum predefined value.

The present value distribution of contingent future positive utility assigns a respective probability to each of a plurality of different total positive utility values where each total positive utility value reflects a benefit gained by the particular asset achieving a certain level of performance. In turn, the present value of the contingent future negative utility reflects a cost incurred by the particular asset achieving the certain level of performance or the benefit gained from the known alternative asset. The present value distribution of contingent future positive utility is determined based upon first parameters that reflect risk in the positive utility, and the present value of the contingent future negative utility is determined based upon second parameters that reflect risk in the negative utility. The first parameters and second parameters may each include a respective mean and standard deviation, and at least one of the first parameters may be different from a corresponding one of the second parameters.

In one example, the cost distribution module is configured to determine a present value distribution of contingent future negative utility. The payoff determinator or performance option valuation module, then, may be configured to select the present value of a contingent future negative utility from the present value distribution of contingent future negative utility.

In one example, the utility distribution module may include a cumulative utility modeler and utility statistics module. In this example, the cumulative utility modeler may be configured to generate a model of total utility that assigns a respective total positive utility value to each of a plurality of levels of performance. And the utility statistics module may be configured to determine the present value distribution of contingent future positive utility based upon the model of total utility.

In one example, the utility distribution module may further include a positive level of performance forecaster and cumulative utility determinator. The positive level of performance forecaster may be configured to forecast a plurality of levels of performance; and the cumulative utility determinator may be configured to identify, from the model, a plurality of total positive utility values associated with the respective forecasted plurality of levels of performance. The utility statistics module may then be configured to determine a mean and a standard deviation of the identified plurality of total positive utility values. In this example, the present value distribution of contingent future positive utility may be determined based upon the mean and standard deviation.

In one example, the utility distribution module may further include a marginal utility module configured to generate a model of marginal utility that assigns a respective marginal positive utility value to each of the plurality of levels of performance. The cumulative utility modeler may then be configured to integrate the model of marginal utility to thereby generate the model of total utility. In this example, each marginal positive utility value reflects a benefit gained by an asset achieving an increase from one level of performance to a next level of performance.

In one example, the utility distribution module may further include a risk-neutral cumulative utility modeler and a non-risk-neutral cumulative utility modeler. The risk-neutral cumulative utility modeler may be configured to generate a risk-neutral model of total utility that assigns a respective risk-neutral total positive utility value to each of the plurality of levels of performance for a risk-neutral condition. The non-risk-neutral cumulative utility modeler may be configured generate a non-risk-neutral model of total utility based upon the risk-neutral model of total utility and the first parameters that reflect a non-risk-neutral condition. The utility statistics module may then be configured to determine the present value distribution of contingent future positive utility based upon the non-risk-neutral model of total utility. In this example, the non-risk-neutral model of total utility assigns a respective non-risk-neutral total positive utility value to each of the plurality of levels of performance.

In one example, the utility distribution module may further include a positive non-risk-neutral coefficient determinator configured to determine a coefficient for each respective risk-neutral total positive utility value based upon the first parameters and the level of performance to which the risk-neutral total positive utility value is assigned. In this example, the non-risk-neutral cumulative utility modeler may be configured to determine each non-risk-neutral total positive utility value based upon the respective coefficient and risk-neutral total positive utility value assigned to a level of performance that is the same as the respective non-risk-neutral total positive utility value.

BRIEF DESCRIPTION OF THE DRAWINGS

Figure 1:
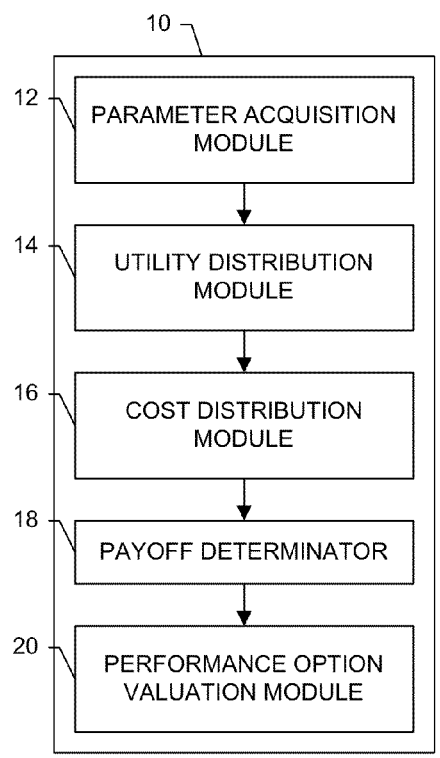
Figure 2:
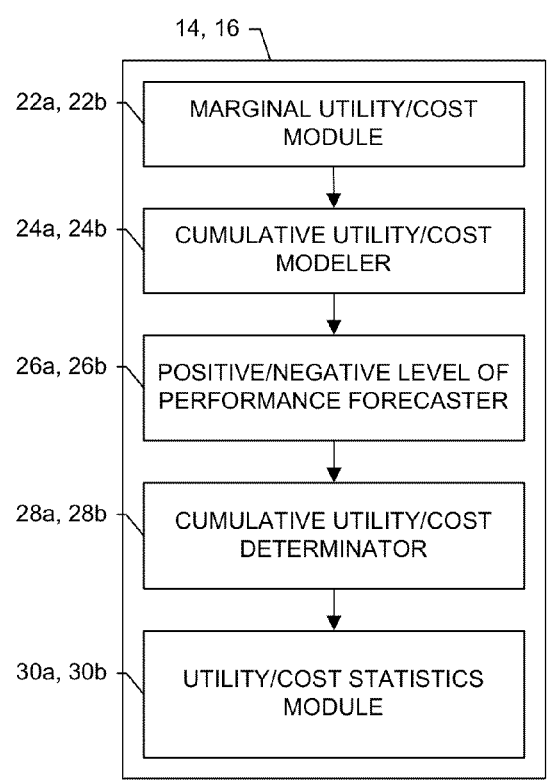
Figure 3A:
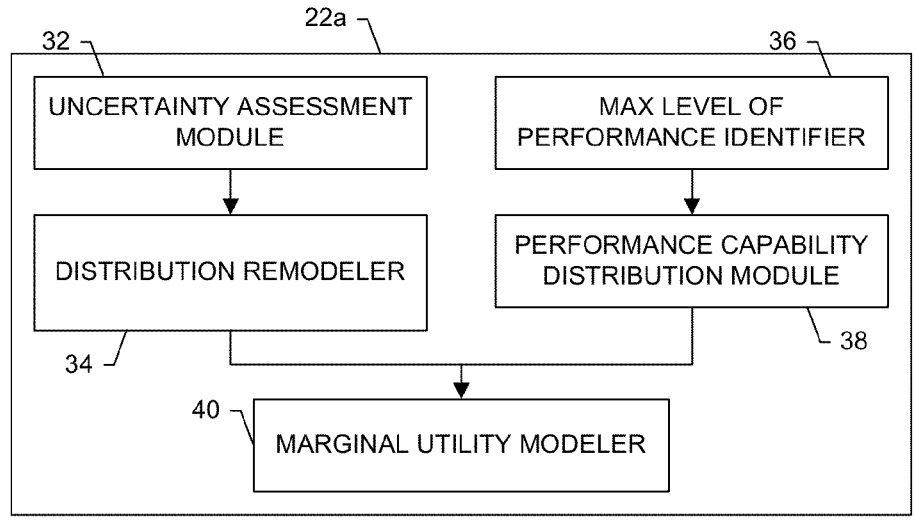
Figure 3B:
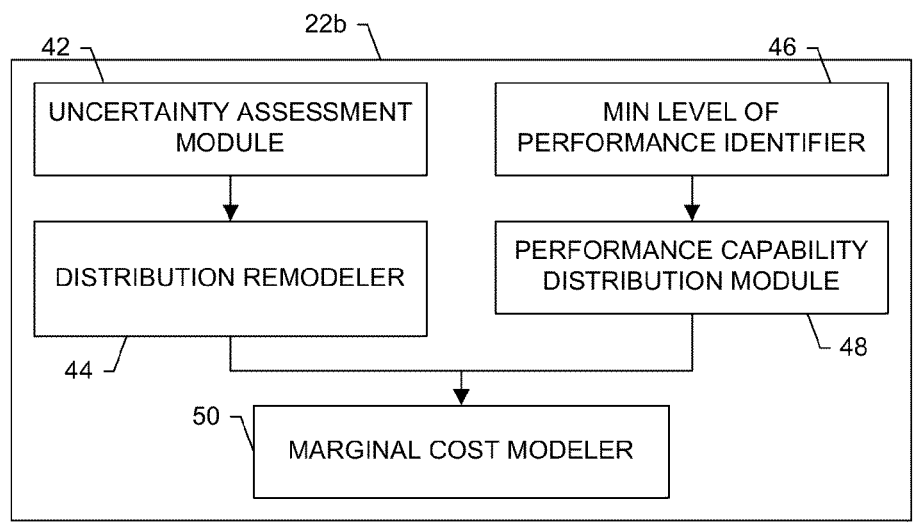
Figure 4:
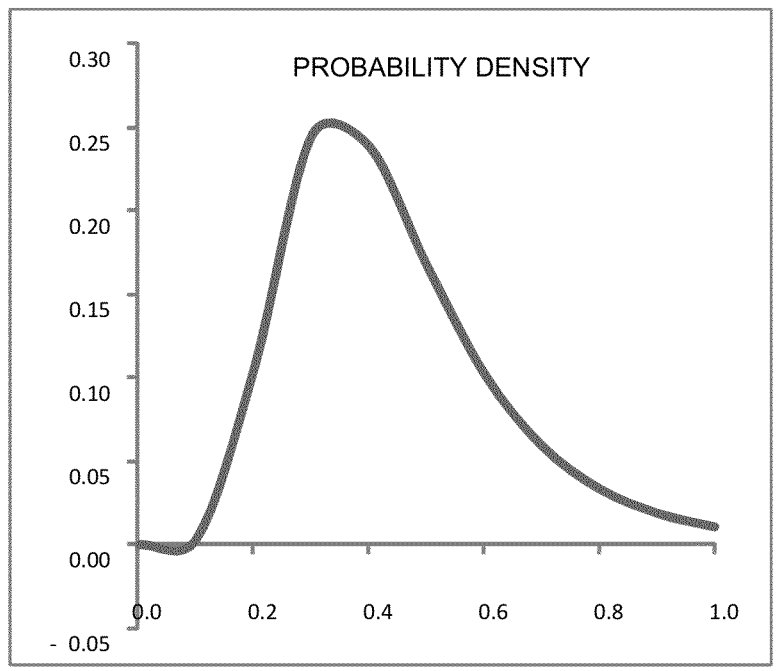
Figure 5:
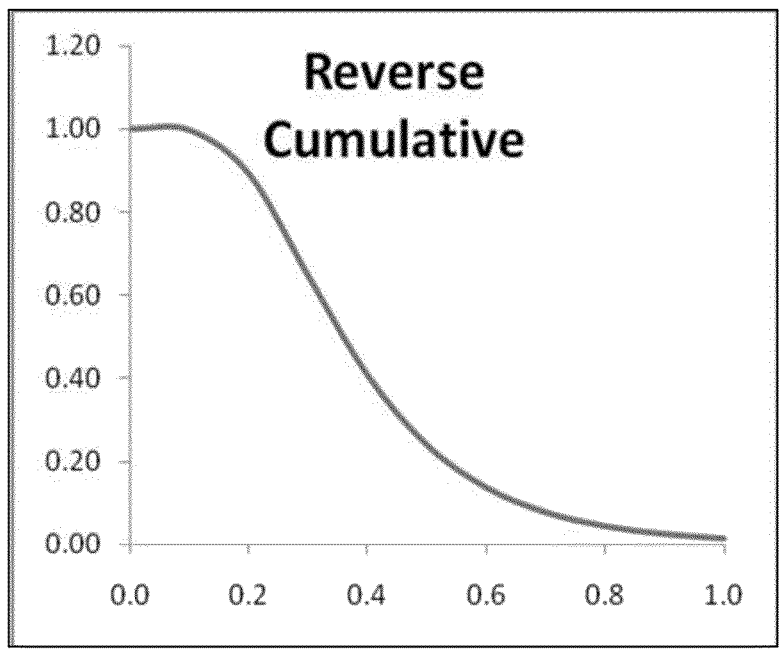
Figure 6:
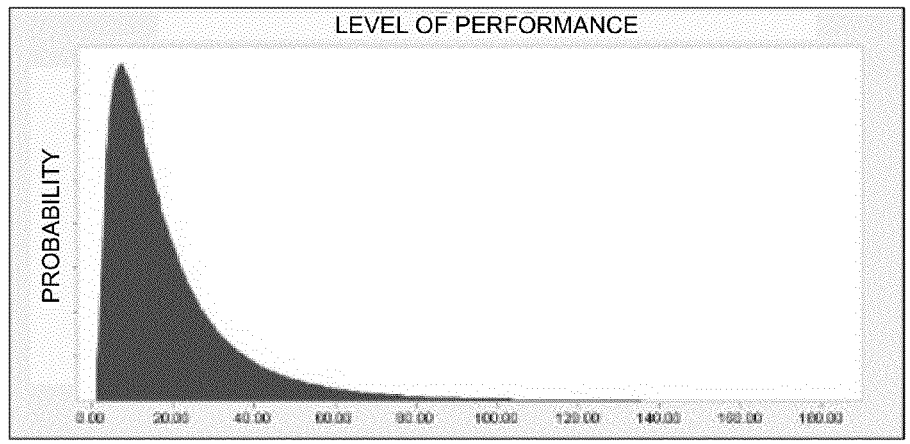
Figure 7:
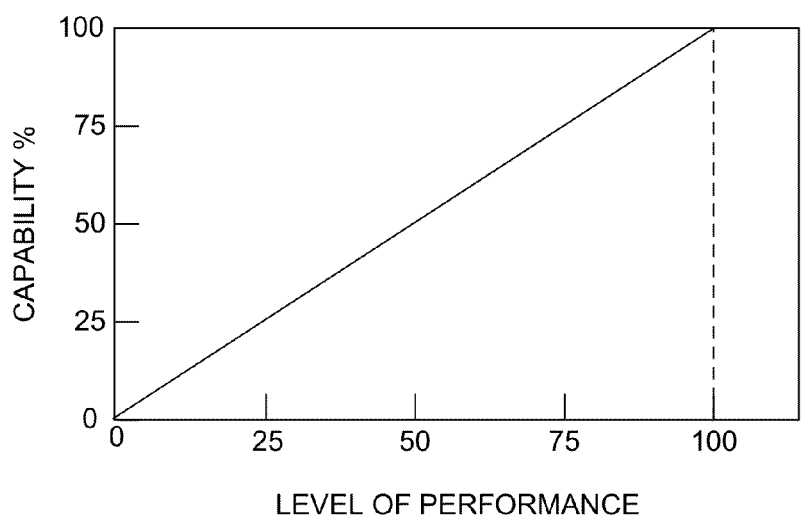
Figure 8:
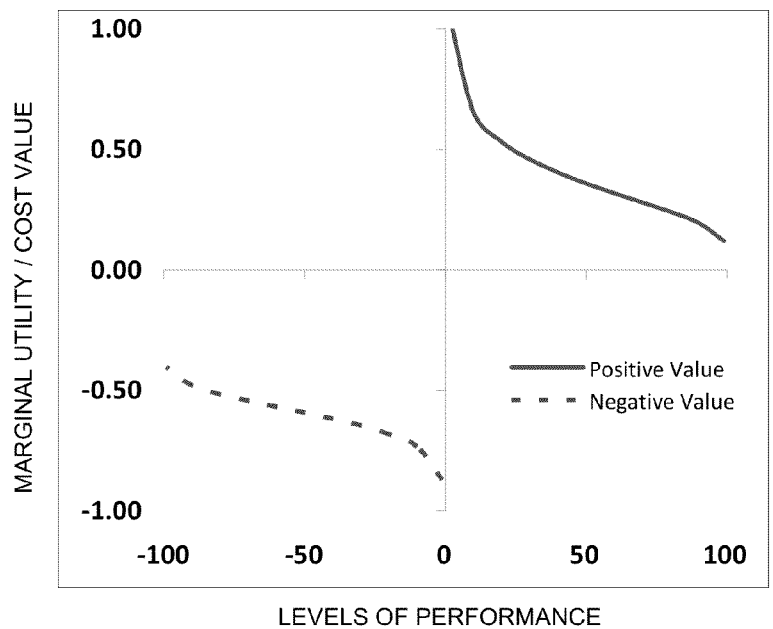
Figure 9:
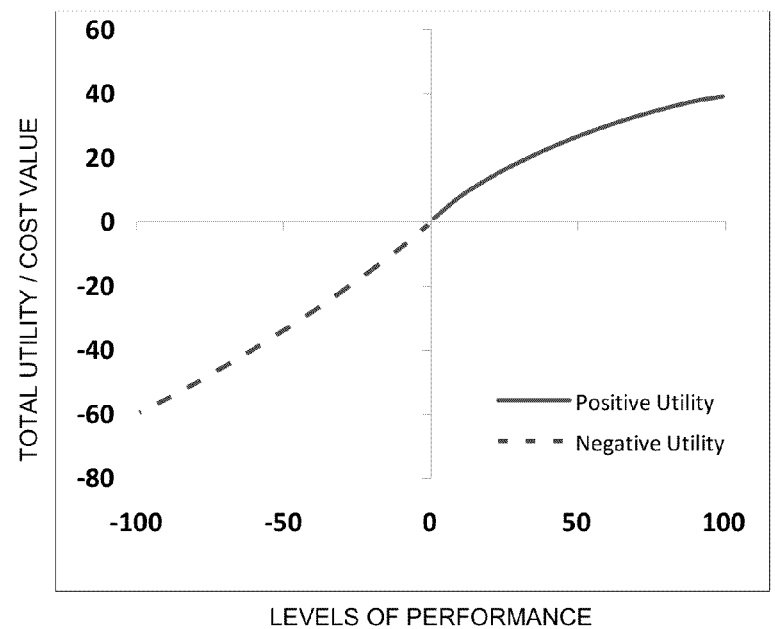
Figure 10:
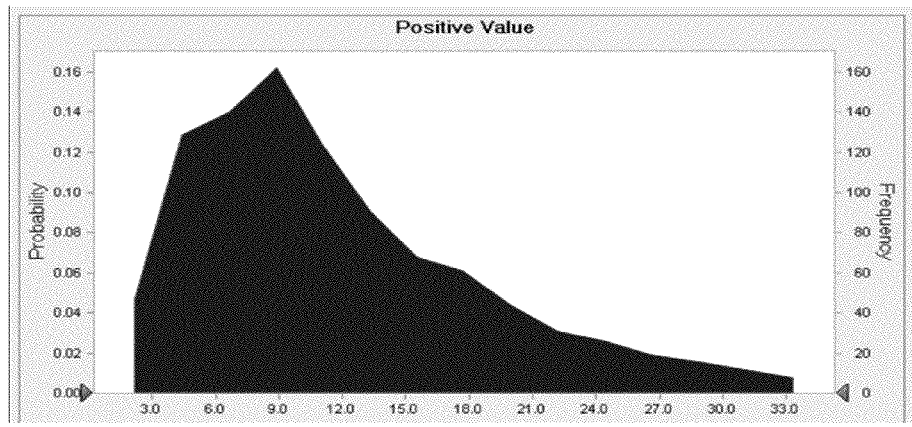
Figure 11:
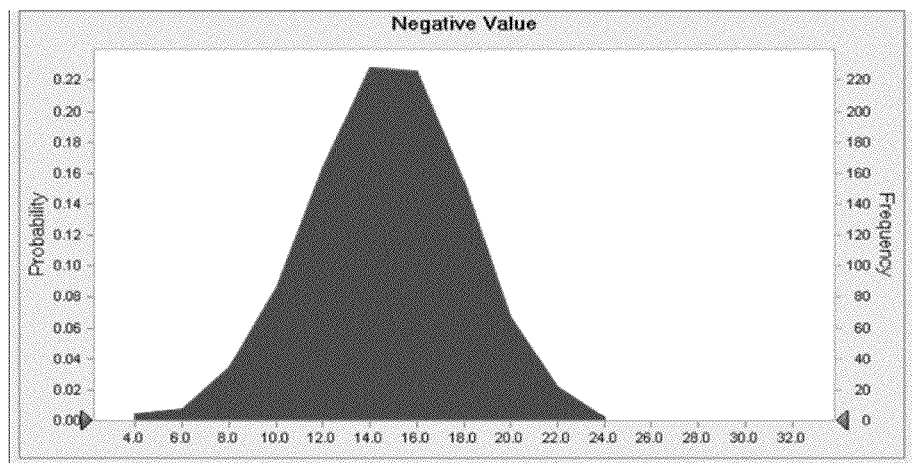
Figure 12:
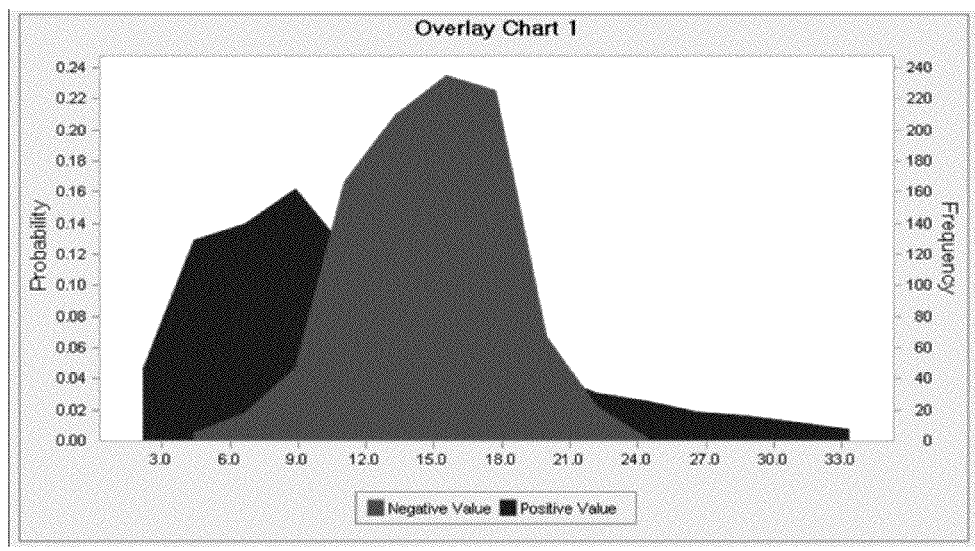
Figure 13:
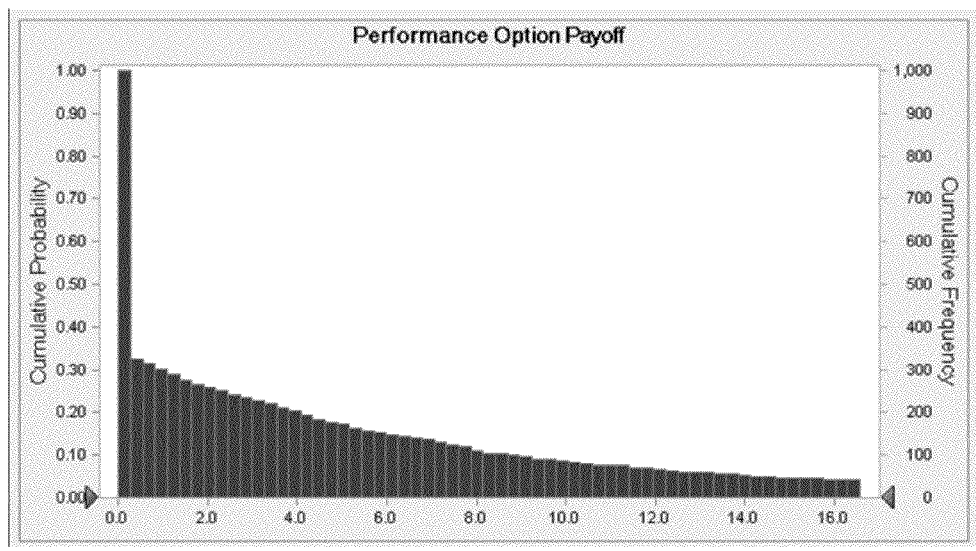
Figure 14:
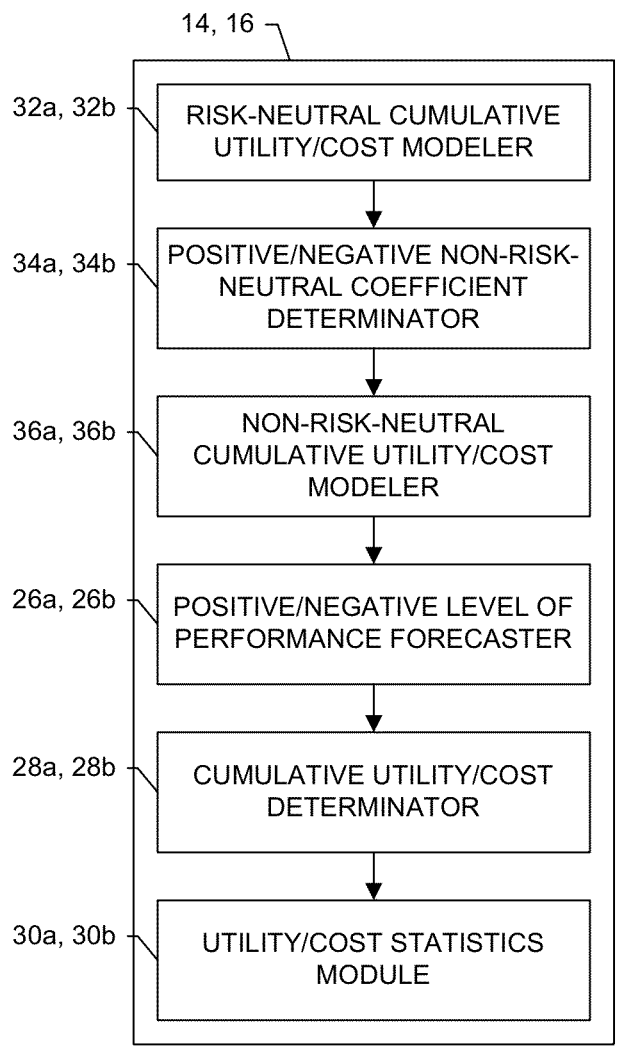
Figure 15:
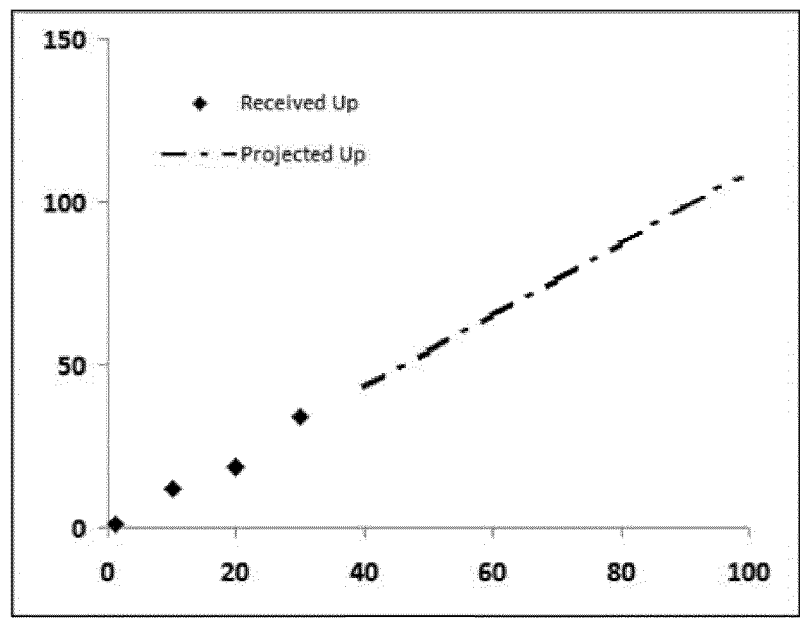
Figure 16:
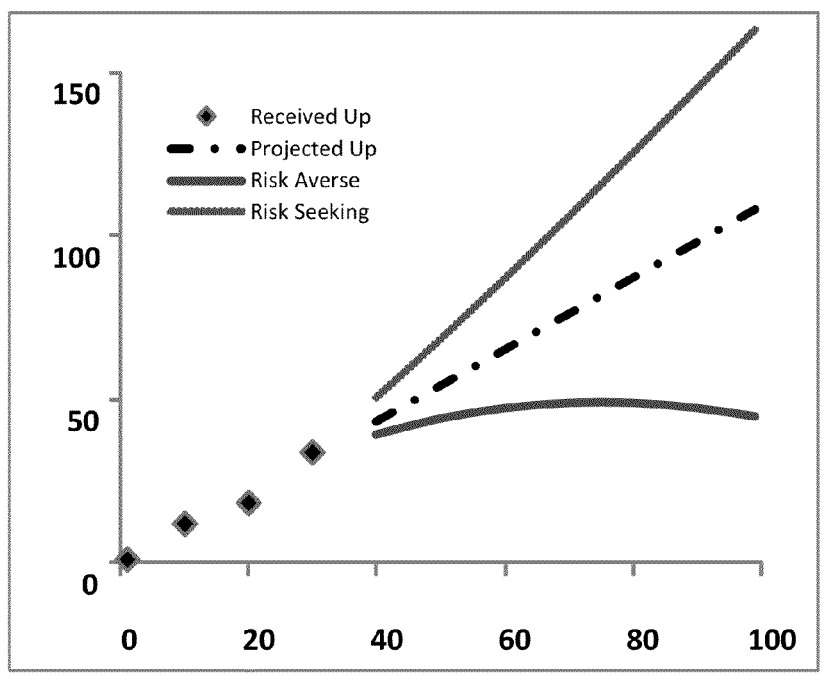

Having thus described the invention in general terms, reference will now be made to the accompanying drawings, which are not necessarily drawn to scale, and wherein:

FIG. 1 is a schematic block diagram of a system configured to perform a contingent claim valuation of a performance option in accordance with example embodiments of the present invention;

FIG. 2 is a schematic block diagram of a utility distribution module or cost distribution module, according to one example embodiment of the present invention;

FIGS. 3a and 3b are schematic block diagrams of a marginal utility module and marginal cost module, respectively, in accordance with one example embodiment of the present invention;

FIGS. 4 and 5 illustrate a price sensitivity distribution (density) and reverse cumulative price sensitivity distribution, respectively, according to example embodiments of the present invention;

FIG. 6 illustrates a positive performance potential distribution, according to example embodiments of the present invention;

FIG. 7 illustrates a performance capability distribution, according to example embodiments of the present invention;

FIGS. 8 and 9 illustrate marginal utility and cost curves, and total utility and cost curves, respectively, according to example embodiments of the present invention;

FIGS. 10, 11 and 12 illustrate distributions of contingent future utility and contingent future cost, and a distribution of contingent future cost overlaying a distribution of contingent future utility, respectively, according to example embodiments of the present invention;

FIG. 13 illustrates an example of a performance option distribution, according to example embodiments of the present invention;

FIG. 14 is a schematic block diagram of a utility distribution module or cost distribution module, according to another example embodiment of the present invention;

FIG. 15 illustrates a total utility curve for a risk-neutral condition according to another example embodiment of the present invention; and FIG. 16 illustrates the risk-neutral total utility curve of FIG. 15 along with corresponding curves for risk-seeking and risk-averse conditions according to another example embodiment of the present invention.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

Throughout this specification and in the claims which follow, unless the context requires otherwise, the word "comprise" and its variations such as "comprises" and "comprising" shall be understood to imply the inclusion of one or more integers, functions, operations, steps or the like but not to the exclusion of any other integers, functions, operations, steps or the like. Similarly, unless the context requires otherwise, the word "include" and its variations such as "includes" and "including" shall be understood to be synonymous with the word "comprising" and its variations.

Example embodiments of the present invention provide a system, method and computer-readable storage medium for performing a valuation of a performance option at a time prior to exercise of the option ("example," "exemplary" and like terms as used herein refer to "serving as an example, instance or illustration"). As explained below, the system of example embodiments of the present invention may include or otherwise be in communication with a number of modules configured to perform respective operations described herein. Although shown as separate modules, it should be understood that the operations performed by more than one module may be integrated within and instead performed by a single module. It should also be understood that operations performed by one module may be separated and instead performed by more than one module.

A module may be embodied as various means for implementing the various functionalities of example embodiments of the present invention. A module may include, for example, one or more processors, memory devices, Input/Output (I/O) interfaces, communications interfaces and/or user interfaces. The processor may include, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Examples of a multi-core processor include two, four, eight, or greater numbers of processing cores. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be configured to operate such that the processor causes the module to perform various functionalities described herein.

Whether configured as hardware alone or via instructions stored on a computer-readable storage medium, or by a combination thereof, the processor may be an apparatus embodying or otherwise configured to perform operations of a module according to embodiments of the present invention while accordingly configured. Thus, in example embodiments where the processor is embodied as, or is part of, an ASIC, FPGA, or the like, the module is specifically configured hardware for conducting the operations described herein. Alternatively, in example embodiments where the processor is embodied as an executor of instructions stored on a computer-readable storage medium, the instructions specifically configure the module to perform the algorithms and operations described herein. In some example embodiments, the processor is a processor of a specific device configured for employing example embodiments of the present invention by further configuration of the processor via executed instructions for performing the algorithms, methods, and operations described herein.

The memory device of a module may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor of the module.

Further, the memory device of a module may be configured to store information, data, applications, computer-readable program code instructions, and/or the like for enabling the module to carry out various functions in accordance with example embodiments of the present invention described herein. For example, the memory device may be configured to buffer input data for processing by the processor of the module. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface of a module may be any device, circuitry, or means embodied in hardware, software or a combination of hardware and software that is configured to interface the processor of the module with other circuitry or devices, such as the communications interface and/or the user interface of the module. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the module to perform, various functionalities of an example embodiment of the present invention.

The communication interface of a module may be any device or means embodied in hardware, software or a combination of hardware and software that is configured to receive and/or transmit data from/to one or more networks and/or any other device or module in communication with the respective module. The communications interface may be configured to provide for communications in accordance with any of a number of wired or wireless communication standards. The communications interface may also be configured to support communications at the network layer, possibly via Internet Protocol (IP). The processor of the module may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. The module of one example may communicate via the communication interface with various other network elements in a device-to-device fashion and/or via indirect communications.

The user interface of a module may be in communication with the processor of the module to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device of the module). In some example embodiments, the user interface circuitry is configured to facilitate user control of at least some functions of the module through the use of a display and configured to respond to user inputs. The processor may also comprise, or be in communication with, display circuitry configured to display at least a portion of a user interface, the display and the display circuitry configured to facilitate user control of at least some functions of the apparatus.

As indicated above, a performance option in the context of project evaluation may be viewed as an option or opportunity to make a resource commitment that may or may not have a long-term beneficial payoff, such as an investment in new technology to improve the performance, capability or characteristics of a new good, service, event or the like. Financial options are contingent claims on financial assets, and are well-understood contractual structures the value of which is based on contingencies contained in clauses. The clauses state the obligations of the two contracting parties in the event the contingency arises at a point in the future. Such a contingency might be that an asset or index value rises (or falls) below a predetermined level. Standardized financial options are routinely valued using sophisticated option valuation mathematical models which trade off the uncertain future value, termed payoff, of the asset and the cost of purchasing the asset. The challenge with classical financial option valuation models is that they are structurally inappropriate for valuing assets outside of a traded market exchange.

Real option valuation models designed to value real capital assets as opposed to financial assets, such as that described by U.S. Pat. No. 6,862,579, may provide an answer to this challenge. These models may fit the less restrictive framework of valuing contingent claims on real assets in incomplete or non-traded markets. Examples of this include valuation of early-stage research and development intended for future products and business opportunities. Here, real options may be used to make current strategic investment decisions that have a contingent claim on potential future, but uncertain benefits (payoff), such as the revenues from a new product, but which also need to be assessed against future uncertain costs (strike price), such as the final design, and factory investments necessary to launch the new product. Of course, it may be desirable to assess this future benefit versus cost analysis against the investors own perception of risk, essentially the investor's value or utility of various future benefit and cost cashflows. The aforementioned '579 patent makes explicit the degree of risk through the use of differential exponential discount rates, one for the benefit cashflows and the other for launch cost cashflows. By changing the relative difference of the two discount rates, the value contingent claim may be brought into alignment with the risk tolerance of the investor. Discount rates are exponential by custom and practice of the time value of money.

Individuals naturally make strategic assessment decisions as an intuitive understanding about balancing the benefits and costs of a future action taken in an uncertain real world. In financial or business strategic environments where the future benefits and costs can be measured or at least modeled in terms of money cashflows, the value of the strategic investment as a contingent claim against the future cashflows may be assessed using either financial or real option calculations. However, there are many strategic decisions in the business world as well as the real world that cannot be addressed by traditional financial or real option calculations in large part because the benefits and costs are not expressed in money cashflows. Yet still all the features of an option-based strategic investment may be present—the benefits, the costs, and the uncertainties that result from a future project (the risk-perception) and the need to make a claim on the contingent payoff by making a strategic investment as a current action. In this context, the option is not a financial one, or based on real assets, but rather one based on an action, or measurably, performance, in the real world action. This is the concept of a performance option.

Perhaps the clearest example of a performance option is in the context of military strategy, where making a current investment in say, training, provisioning and positioning of troops ahead of a prospective battle, is a claim on the benefits, or spoils, of the outcome, albeit at some cost. However, the structure of financial or real option calculations do not translate directly into military strategy. For example, there are no cashflows on the battle field. Example embodiments of the present invention are intended to bring an option structure to strategic investment contingent claims for real-world decisions. The performance options may form a complete transition to non-market non-financial strategic applications such as military strategy.

Example embodiments of the present invention may be configured to perform valuation of a performance option in a wide variety of projects or for a wide variety of goods, services or the like. The committed resources as well as the anticipated payoff may be of any quality. In the financial or project option context, for example, both the committed resource (termed "investment" in subsequent paragraphs) and the anticipated payoff may be evaluated using the same monetary units. Risk perception, as well as time value, may be accounted for by the use of an exponential discount rate. In the terms of a project option, however, the monetary units ascribed to the payoff may be the result of a transformation of unit price multiplied by unit sales. A performance option may describe an additional transformation whereby both the investment and payoff maybe in different, non-monetary units, and the risk perception may be accounted for by other than exponential discounting, such as lognormal discount rates for risk and time. Ultimately, a performance option may facilitate quantifying a tradeoff between investing something small now in exchange for an uncertain future benefit that outweighs current circumstances.

For example, the investment may be in units of time, and the payoff may also be in units of time. Note that the investment may be in the context of time spent, while the payoff may be in the context of time saved. The adage "a stitch in time saves nine" may reflect the operation of a performance option in this context. The performance option, however, may provide a significantly refined, quantitative response, such as a 1.75 stitch in time saves 13.23, or the like.

A driver of a vehicle may use this intuition to solve strategically difficult environmental and contextual challenges such as averting a traffic jam ahead on a customarily-traveled road. The strategic choice may be whether or not it is worthwhile to invest a small amount of time to divert to a side street with the anticipated payoff of finding a more suitable thoroughfare, and thus saving time compared with the risk-neutral alternative to converge into the traffic jam and wait it out. What is the time cost of the side street? What is the anticipated time savings given the uncertainty of the alternative route? What is the cost of waiting out the traffic jam? Are there other contingencies that impact the decision path, such as how fuel is in gas tank? And how do these estimates change depending on the risk-perception of the driver? Does a risk-averse driver choose a different path than a risk-seeking driver? Is there an important delivery deadline that must be met thus changing the risk attitude of the driver, e.g., altering the perceived value of waiting or taking a path to the destination?

In a more particular context by which example embodiments of the present invention may find value, consider multi-player competitive settings where the valuation of an investment may be contingent on the (investment) actions of other players. In this case, the example embodiments of the present invention may optimize the timings of investment decisions, such as by adjusting for the risk incurred from past actions taken as well as for future (possible) actions by other players.

By way of a specific example of a multiplayer competitive setting, consider the problem of pit-stop timings in Formula One (F1) racing. The F1 pit stop strategy problem may be briefly described as follows: to obtain a higher finishing rank, a driver must minimize the time he/she requires to complete the race distance. Leaving aside the externalities from others' presence on track, a driver's pace may be above all dictated by the fuel onboard and the state of his/her tires, which is to say the extent of degradation of those tires. Every lap of fuel carried during a stint, i.e., for the laps between pit stops, may slow the car down by some estimable amount, whereas every lap raced on a set of tires may also degrade the tires by some measurable amount. This aggregate impact on time performance may be estimated using statistical analyses to derive a mean and standard deviation parameters for that performance. Furthermore, race-time performance may be projected forward but only within a probability range owing to statistical uncertainty. Because of the uncertainty in this forward-performance projection, risk perception (i.e., whether to be more cautious, risk-averse, or more aggressive, risk-seeking, in the interpretation, or utility, of the time-performance projection) may be assessed.

Pit stops may be used to change tires and (possibly) add fuel. Thus, pit stops may potentially result in a positive time performance advantage. But this may be achieved only by a negative, or costly, time performance disadvantage that is the loss of time for the pit stop. This negative impact on time performance may be estimated using statistical analyses to derive a mean and standard deviation parameters for that performance loss. Furthermore, a future pit stop time-performance impact may be projected forward but only within a probability range owing to statistical uncertainty. Because of the uncertainty in this forward-negative-performance projection, risk perception (i.e., whether to be more cautious, risk-averse, or more aggressive, risk-seeking, in the interpretation, or utility, of the time-loss-performance projection) may be assessed.

By this scenario, pit-stop strategy may amount to deciding on a future schedule of pit stops, i.e., lap number and the total number of stops, such that the total time to complete the race distance is minimized. The pit stop strategy problem may be further complicated in actuality by the presence of other actors on track. Overtaking being notoriously difficult in F1, it may very much be the case that a much faster car can be held up by a slower car. This phenomenon makes the solution to a driver's optimal pit-stop strategy problem highly contingent on the solutions to his/her opponents' pit stop strategy problems. Example embodiments of the present invention may be used to optimize (time) performance investment decisions in the multi-player competitive setting such as F1 pit-stop strategy by appropriately adjusting for the risk (as a premium on the time to complete the race distance) imposed from uncertain but estimable variables like the onboard fuel effect and tire degradation as well as from the recursive interdependencies imposed from the presence of other actors.

In accordance with example embodiments of the present invention, the performance-option valuation may be performed as a function of a future positive utility (at times simply referred to as "utility") attributable to making a resource commitment to an underlying good, service, event or the like (generally described as an "asset"). In addition, the performance-option valuation may be performed based upon a future negative utility (at times simply referred to as "cost") required to make the resource commitment to the asset or deviate from a resource commitment to a known alternative asset.

Example embodiments of the present invention will be described in conjunction with the valuation of a performance option at an initial, present time. However, in determining the present value of a performance option, example embodiments of the present invention may be equally capable of determining the present value of the performance option at any time prior to the exercise of the performance option such that subsequent discussion of present value includes a valuation at any time prior to the exercise of the performance option.

In accordance with example embodiments of the present invention, positive utility may be considered a measure of the satisfaction or benefit that a consumer gains from a particular asset, such as may be realized by a level of performance achieved by the asset. Conversely, negative utility may be generally considered a measure of the dissatisfaction or cost that a consumer incurs by the particular asset achieving the certain level of performance, or the satisfaction or benefit that the consumer gains from a known alternative to the particular asset. Utility may be viewed as a total utility or marginal utility. Total utility may measure the aggregate sum of satisfaction/benefit that an individual gains from an asset achieving a certain level of performance, where the total utility may vary directly with increased levels of performance. Marginal utility, on the other hand, may measure the additional satisfaction, or amount of utility, that the consumer gains from the asset achieving each extra level of performance.

Total positive utility may be represented by a maximum price a consumer is willing to pay to achieve a certain level of performance from an asset. Positive marginal utility, on the other hand, may be represented by a maximum price a consumer is willing to pay for an increase in the level of performance from one level to the next. Total and marginal negative utility may be thought of in the inverse of total and marginal positive utility, and in which the levels of performance may be either negative or comparative.

Levels of performance (or satisfaction) may represent observable or measurable real (world) outcomes such as time, MOE (measures of effectiveness such as military force or intelligence superiority), MOP (measures of performance such as speed, capacity or distance) or the like. The utility of an asset may be represented by a function of a price per level of performance and the possible levels of performance in terms of a maximum level of performance, both of which differ depending upon the asset. Performance may be measured in linear, exponential or lognormal, or other non-linear or discrete scales of performance; and the performance measure may include an amount of uncertainty. Furthermore, performance may be an aggregation of several variables (e.g., the sum of speed, capacity and distance), and therefore, the units of performance may be a weighted, calculated or arbitrary combination of the variables and expressed in dimensionless units. Finally, performance may be modeled based on a distribution of possible performance levels within the real world.

In modeling utility at some subsequent time in the future, the price and/or the maximum level of performance may include an amount of uncertainty. Thus, the utility may be modeled based upon a distribution of the possible prices an individual is willing to pay for a certain level of performance or satisfaction from an asset, and/or a distribution of the possible maximum levels of performance that the asset may achieve.

Reference is now made to FIG. 1, which illustrates a system 10 for performing a performance-option valuation according to one example embodiment of the present invention. Before discussing the various modules of the system, it should be noted that as shown and described herein, the utility and cost may be modeled in the same or similar manners, or may be modeled in different manners. In instances in which the utility and cost are modeled in different manners, one of the utility and cost may be modeled as described herein, and the other may be modeled in one of a number of other manners such as according to option strike price mean/standard deviation approaches. This exemplary embodiment will more particularly describe modeling both utility and cost, although it should be understood that either may be modeled in another manner.

Referring to FIG. 1, the system for performing a performance-option valuation according to one example embodiment of the present invention may include a parameter acquisition module 12 configured to select, determine or otherwise calculate one or more parameters. These parameters may include, for example, a first mean and standard deviation that may reflect risk or uncertainty in the utility (positive utility), and a second mean and standard deviation that may reflect risk or uncertainty in the cost (negative utility). In one example, each mean and standard deviation may reflect a mean (expected value—E[X]) and standard deviation StdDev [X] for a lognormally-distributed variable X. The first (positive utility) mean and standard deviation may be expressed respectively as $E_1[X]$ and $StdDev_1[X]$, and second (negative utility) mean and standard deviation may be expressed respectively as $E_2[X]$ and $StdDev_2[X]$.

The first and second means and standard deviations may be selected or otherwise developed in any of a number of different manners. In one example, the means and standard deviations may be developed from real or hypothetical data, such as from an estimator, market survey or the like. Generally the absolute value of $U_2$, as expressed by the combination of $E_2[X]$ and $StdDev_2[X]$ may be greater than or equal to that of $U_1$, as expressed by $E_1[X]$ and $StdDev_2[X]$ since, from behavioral finance, losses (costs) may be weighted more than gains (benefits). Furthermore, the higher StdDev[X] may imply higher levels of uncertainty, and therefore of risk perception, while StdDev[X]=0 may correspond to a risk-neutral (no uncertainty) condition. In one example, $StdDev_2[X]$ may be less than or equal to $StdDev_1[X]$ as gains (benefits) may have greater uncertainty than losses (costs).

The example embodiment described immediately below may employ one first mean and standard deviation pair to represent a particular risk perception. It should be understood, however, that the performance-option valuation may be performed for more than one risk perception. For example, the valuation may be performed for both a risk-averse condition and a risk-seeking condition, each having a respective first mean and standard deviation.

The system 10 also includes a utility distribution module 14 configured to determine or otherwise calculate a distribution of contingent future utility. Similarly, the system includes a cost distribution module 16 configured to determine or otherwise calculate a distribution of contingent future cost. The distributions may be determined in a number of different manners. FIG. 2 is a block diagram illustrating various modules that may form the utility or cost distribution modules (generally referred to as a utility/cost distribution module), according to one example embodiment. As shown, the utility/cost distribution module may include a marginal utility/cost module. This module may be a marginal utility module 22a configured to model or otherwise generate a model of marginal utility (for the utility distribution module 14), or a marginal cost module 22b configured to model or otherwise generate a model of marginal cost (for the cost distribution module 16). The respective models may be generated in a number of different manners. One example of a marginal utility module is shown in FIG. 3a, and one example of a marginal cost module is shown in FIG. 3b.

Referring to FIG. 3a, the marginal utility module 22a of one example embodiment includes an uncertainty assessment module 32 configured to assess uncertainty in the price per level of performance of the asset. The assessment may include determining how the price of the asset with a particular level of performance affects whether customers will purchase the respective asset. Or in the case of modeling cost, the assessment may include determining how the price of the asset with a particular level of performance affects whether manufacturers will supply the respective asset, or an assessment of the current level of performance.

In one example embodiment, uncertainty in the price (value) of each level of performance of the asset, and thus the uncertainty assessment, may be expressed in a price sensitivity distribution of a purchase of the asset with a particular level of performance at a predetermined price. The price sensitivity distribution generally assigns a probability of a purchase of the asset with a particular level of performance to each respective price at which consumers would purchase the respective asset. The price sensitivity distribution can be expressed according to any of a number of different probability distribution types such as normal, triangular or uniform. But in one example embodiment, the price sensitivity distribution is expressed as a lognormal probability distribution. Also, the price sensitivity distribution can be defined according to any of a number of different parameters, such as the mean and standard deviation of the price per level of performance.

In one example embodiment, the price per level of performance may be represented by the first mean ($E_1[X]$) and standard deviation ($StdDev_1[X]$). In this example, the mean $\mu_1$ and standard deviation $\sigma_1$ of the variable's natural logarithm may be determined as follows:

$$\mu_1 = \ln(E_1[X]) - \frac{1}{2}\ln\left(1 + \frac{StdDev_1[X]^2}{E_1[X]^2}\right) \quad (1)$$

$$\sigma_1 = \sqrt{\ln\left(1 + \frac{StdDev_1[X]^2}{E_1[X]^2}\right)} \quad (2)$$

The price sensitivity distribution in this example may therefore be defined according to the first lognormal mean $\mu_1$ and standard deviation $\sigma_1$.

FIG. 4 illustrates a probability distribution (density) according to example embodiments of the present invention. The following table illustrates various values that may result from the probability distribution of FIG. 4.

TABLE 1

| Z | X | Density |
|---|---|---|
| −2.0 | 0.0 | 0.00 |
| −1.5 | 0.1 | 0.00 |
| −1.0 | 0.2 | 0.11 |
| −0.5 | 0.3 | 0.25 |
| 0.0 | 0.4 | 0.24 |
| 0.5 | 0.5 | 0.17 |
| 1.0 | 0.6 | 0.10 |
| 1.5 | 0.7 | 0.06 |
| 2.0 | 0.8 | 0.03 |
| 2.5 | 0.9 | 0.02 |
| 3.0 | 1.0 | 0.01 |

In the preceding example, the price per level of performance have a first mean $E_1[X]=0.4$ and standard deviation $StdDev_1[X]=0.2$; and from these values, a lognormal mean $\mu_1=-1.03$ and standard deviation $\sigma_1=0.47$ may be calculated in accordance with equations (1) and (2). Also, in the above table, Z represents the standardized values (z-scores) of random variable X, and may be expressed as $Z=(X-E_1[X])/StdDev_1[X]$.

The marginal utility module 22a may also include a distribution remodeler (module) 34 configured to cast the price sensitivity distribution as a reverse cumulative distribution. A reverse cumulative distribution depicts the number, proportion or percentage of values greater than or equal to a given value, and may represent the distribution of a purchase of the asset with a particular level of performance for at least a predetermined price, i.e., at or above a predetermined price. An example of a reverse cumulative of a price sensitivity distribution is shown in FIG. 5.

In addition to factoring uncertainty in the price per level of performance of the asset into the utility of the asset, the utility may be modeled as a function of an uncertain level of performance that is achievable by the asset. In such instances, a positive performance potential distribution may be determined in a manner similar to that described above for the price sensitivity distribution. That is, mean and standard deviation may be calculated from real or hypothetical data, which may define a positive performance potential distribution, an example of which is shown in FIG. 6. In addition to providing a basis for developing a performance potential distribution, a maximum likely level of performance may be identified from or based upon the data. In other instances, however, the maximum level of performance may be known or otherwise given. In either instance, however, the marginal utility module 22a may include maximum level of performance identifier (module) 36 configured to identify or otherwise provide a maximum level of performance.

As a consumer may not be capable of capturing the maximum (i.e., 100%) level of performance of an asset, utility of the asset may be modeled to account for different percentages of the maximum level of performance that a consumer may capture. Therefore, the marginal utility module 22a may include a performance capability distribution module 38 configured to determine, from the maximum level of performance, a performance capability distribution based upon different levels of performance that represent corresponding percentages of the maximum level of performance. For example, in an instance of a maximum level of performance of 100, a level of performance of 10 may represent a performance capability of 10%, a level of performance of 20 may represent a performance capability of 20%, and so forth. An example of a performance capability distribution is shown in FIG. 7.

Even further, the marginal utility module 22a may include a marginal utility modeler (module) 40 configured to model the marginal utility (or utility value) as a function of the price sensitivity distribution and performance capability distribution. For levels of performance up to the maximum, the utility represents the level of performance for which consumers will purchase the asset for at least a given price, i.e., at or above a given price. To model the utility, each probability percent of the reverse cumulative price sensitivity distribution may be associated with a corresponding percentage of the maximum level of performance from the performance capability distribution. Written notationally, a marginal utility (positive utility) value $MU_p$ may be calculated as a function of level of performance L in accordance with the following:

$$MU_p(L)=e^{[\mu_1+\sigma_1(-Z)]}=e^{[\mu_1+\sigma_1 NORMSINV(r(L))]} \quad (3)$$

in which $r(L)$ reflects the risk perception and may be set to $r(L)=L/MaxL$ for a risk-seeking condition, or $r(L)=1-L/MaxL$ for a risk-averse condition. Also in the preceding, MaxL represents the maximum level of performance, and NORMSINV represents a function that returns the inverse of the standard normal cumulative distribution. As shown, the calculation is the reverse cumulative, although the normal cumulative is possible.

As above, each of a plurality of different levels of performance of the asset from the performance capability distribution may be linked to a minimum price per unit from the reverse cumulative price sensitivity distribution having a probability percent equal to the performance capability percent for the respective level of performance. As such, the utility model may be thought of as a plurality of different levels of performance for an asset for which a maximum level of performance is achievable, each level of performance having a corresponding minimum price at which consumers will purchase an asset with the respective level of performance.

According to one example embodiment of the present invention, the marginal cost module 22b may be configured to model marginal cost (negative utility) in a manner similar to that described above with respect to the marginal utility module 22a being configured to model marginal utility (positive utility). FIG. 3b illustrates the marginal cost module according to one example embodiment, in which a number of the illustrated modules may function in a manner similar to those of FIG. 3a. As shown, the marginal cost module may include an uncertainty assessment module 42 configured to determine a price sensitivity distribution (compare to uncertainty assessment module 32 of FIG. 3a), which may employ the second (negative utility) mean and standard deviation instead of the first (positive utility) mean and standard deviation.

The marginal cost module 22b may include a distribution remodeler (module) 44 configured to cast the price sensitivity distribution as a cumulative probability distribution, instead of as a reverse cumulative probability distribution as the distribution remodeler 34 of FIG. 3a. A cumulative distribution depicts the number, proportion or percentage of values less than or equal to a given value, and may represent the distribution of an asset with a particular level of performance supplied when the market price for the asset is at least a predetermined price, i.e., at or above a predetermined price.

Similar to modeling utility, modeling cost may also include identifying or otherwise providing a maximum level of performance, and determining a performance capability distribution based on the respective maximum. In one example, the maximum level of performance may be identified from or based upon real or hypothetical data, from which a mean and standard deviation defining a negative performance potential distribution may also be calculated. As indicated above, the levels of performance in modeling cost may be negative, and accordingly, the levels of performance in modeling cost may be negative, and as such, the maximum level of performance may rather be a minimum level of performance. Thus, the marginal cost module 22b may include a minimum level of performance identifier (module) 46 configured to identify or otherwise provide a minimum level of performance, and a performance capability distribution module 48 configured to determine a performance capability distribution based on the respective minimum.

Further, the marginal cost module 22b may include a marginal cost modeler (module) 50 configured to model cost as a function of the price sensitivity distribution and performance capability distribution (compare to marginal utility modeler 40 of FIG. 3a). For a minimum, then, the cost represents the negative utility manufacturers will endure to produce an asset when the market price for the asset is at least a given price, i.e., at or above a given price. To model the cost, each probability percent of the cumulative of the price sensitivity distribution may be associated with a corresponding percentage of the levels of performance from the performance capability distribution. Written notationally, the marginal cost (negative utility) $MU_n$ may be calculated in a manner similar to that described above with respect to equation (3), but utilizing parameters particular to cost. These parameters may include a second lognormal mean $\mu_2$ and standard deviation $\sigma_2$, which may be calculated from the second mean $E_2[X]$ and standard deviation $StdDev_2[X]$ such as in accordance with equations (1) and (2). The parameters may also include MinL representing the minimum level of performance. Thus, the marginal cost (negative utility) value $MU_n$ may be calculated in accordance with the following:

$$MU_n(L) = e^{[\mu_2 + \sigma_2(-Z)]} = e^{[\mu_2 + \sigma_2 NORMSINV(r(L))]} \quad (4)$$

Again, the calculation shown is the reverse cumulative, although the normal cumulative is possible.

As above, each of a plurality of different levels of performance of the asset from the performance capability distribution may be linked to a maximum price per unit from the cumulative price sensitivity distribution having a probability percent equal to the performance capability percent for the respective level of performance. As such, the cost model can be thought of as an asset with a plurality of different levels of performance, each level of performance having a corresponding maximum market price.

The marginal utility and cost models may be represented in any one of a number of manners. In one example embodiment, the utility model may be represented as a utility curve by plotting different levels of performance versus the minimum price consumers will pay per level of performance for the asset. Similarly, in one example embodiment, the cost model may be represented as a cost curve by plotting different levels of performance versus the maximum market price of the asset with the respective levels of performance.

To further illustrate example embodiments of the present invention, consider an asset having the following parameters:

TABLE 2

| Positive Utility | | Negative Utility | |
|---|---|---|---|
| MaxL | 100 | MinL | −100 |
| $E_1[X]$ | 0.40 | $E_2[X]$ | 0.60 |
| $StdDev_1[X]$ | 0.20 | $StdDev_2[X]$ | 0.10 |
| $\mu_1$ | −1.03 | $\mu_2$ | −0.52 |
| $\sigma_1$ | 0.50 | $\sigma_2$ | 0.20 |

In this example, the following positive utility and negative utility (cost) values and their respective linked levels of performance may be calculated as follows:

TABLE 3

| Positive Marginal Utility | | Negative Marginal Utility | |
|---|---|---|---|
| L | $MU_p$ | L | $MU_n$ |
| 1 | 1.07 | −1 | −0.87 |
| 10 | 0.66 | −10 | −0.73 |
| 20 | 0.53 | −20 | −0.68 |
| 30 | 0.46 | −30 | −0.65 |
| 40 | 0.40 | −40 | −0.62 |
| 50 | 0.36 | −50 | −0.59 |
| 60 | 0.32 | −60 | −0.57 |
| 70 | 0.28 | −70 | −0.54 |
| 80 | 0.24 | −80 | −0.51 |

TABLE 3-continued

| Positive Marginal Utility | | Negative Marginal Utility | |
|---|---|---|---|
| L | $MU_p$ | L | $MU_n$ |
| 90 | 0.20 | −90 | −0.48 |
| 99 | 0.12 | −99 | −0.40 |

These values, then, may be plotted to form a utility curve (positive value) and cost curve (negative value), as shown in FIG. 8.

As indicated above, the utility of the asset may be based upon the reverse cumulative of the price sensitivity distribution and the performance capability distribution, and the cost of the asset may be based upon the cumulative of the price sensitivity distribution and the performance capability distribution. It will be appreciated that the operations in determining the reverse cumulative (or cumulative) of the price sensitivity distribution and the performance capability distribution may be accomplished in any order relative to one another without departing from the spirit and scope of the present invention. For example, the price sensitivity distribution may be cast in reverse cumulative format before any or all of the operations in determining the performance capability distribution.

Returning to FIG. 2, the utility/cost distribution module may also include a cumulative utility modeler (module) 24a (for the utility distribution module 14), or a cumulative cost modeler (module) 24b (for the cost distribution module 16). These modules may be configured to model or otherwise generate a model of cumulative utility or cost as a function of the respective marginal utility and cost models. The cumulative utility and cost of the asset may be modeled in a number of different manners. In one example embodiment, the cumulative utility/cost may be modeled as a cumulative utility/cost at each of a plurality of levels of performance. The cumulative utility/cost at each level of performance $L_i$, in turn, may be determined as the mathematical integral of the marginal utility/cost over the interval from zero to the respective level of performance $L_i$ (or from the respective level of performance to zero). That is, the cumulative utility (positive utility) $U_p$ and cost (negative utility) $U_n$ at a level of performance $L_i$ may be calculated as follows:

$$U_p(L_i) = I(L_i) = \int_0^{L_i} MU_p(L) dL \quad (5)$$

$$U_n(L_i) = I(L_i) = \int_{L_i}^0 MU_n(L) dL \quad (6)$$

Although the marginal utility/cost model may be integrated as per the above equations (5) and (6), in various example embodiments, the marginal utility/cost model may be integrated in accordance with any of a number of numerical algorithms for approximating the above equations, such as the multiple-application or composite, integration algorithm. In accordance with the composite algorithm, for each level of performance L, the integral may be calculated by dividing the integration interval from 0 to L into a number of n+1 equally-spaced segments ($l_0, l_1, l_2, f, l_n$) in which each of the segments has a width h=L/n, and in which $l_n$=L. The integral I for the level of performance L, then, may be calculated in accordance with the following:

$$I(L) = L \frac{MU(l_0) + 2\sum_{i=1}^{n-1} MU(l_i) + MU(l_n)}{2n} \quad (7)$$

In the context of modeling cumulative utility $U_p$, the marginal utility MU in equation (7) may be the positive marginal utility $MU_p$; and in the context of modeling cumulative cost $U_n$, the marginal utility MU may be the negative marginal utility $MU_n$.

The number of segments n+1 may be set in any of a number of different manners, and in one example, may be a function of the respective level of performance L. More particularly, for example, consider the case of a number of m+1 equally-spaced levels of performance ($L_0, L_1, L_2, L_3, \ldots, L_m$) in which $L_m$=MaxL in the context of modeling positive utility, or $L_m$=MinL in the context of modeling negative utility. In this example, the number of segments may be set such that for $L_k$, the number of segments may be set to (k+1)×(n+1).

In one example embodiment, the segments may correspond to levels of performance ($L_0, L_1, L_2, L_3, \ldots, L_m$). In this example, also consider that the levels of performance may but need not be equally spaced, and that $I(L_0)=0$. For each level of performance $L_k$, k≥1, the integral in this example may be calculated in accordance with the following:

$$I(L_k) = \sum_{i=1}^{k} \left[ (L_i - L_{i-1}) \frac{MU(L_i) + MU(L_{i-1})}{2} \right] \quad (8)$$

In yet another example, taking into account the utility and cost value functions of equations (3) and (4), the integral for a level of performance L may be calculated according to the following pseudo-code algorithm (9):

```
sum = 0                                                    (9)
i = 0.01
Do while i ≤ (L / MaxL)
    If Risk Seeking, then
        sum = sum + e^[μ+σNORMSINV(i)]
    else, if Risk Averse
        sum = sum + e^[μ+σNORMSINV(1−i)]
    i = i + 0.01
Loop
I(L) = sum
```

In the above algorithm (9), the mean μ and standard deviation σ may be the first mean $\mu_1$ and standard deviation $\sigma_1$ in the context of modeling cumulative utility $U_p$, or the second mean $\mu_2$ and standard deviation $\sigma_2$ in the context of modeling cumulative cost $U_n$. Also in the above, the step counter i may be initialized to and have a step of any of a number of different values, such as $10^{-4}$ in another example. Further, the condition "Risk Seeking" denotes a risk-seeking condition, and "Risk Averse" denotes a risk-adverse condition. The if-then statement permits application of a normal integration for a risk-seeking valuation, or a reverse integration for a risk-averse valuation. Notably, in a risk-neutral condition, both expressions of sum yield the same result, and thus, in a risk-neutral condition, either of the expressions provided by the if-then statement may be implemented.

Similar to the marginal utility/cost models, the cumulative utility/cost models may be represented in any one of a number of manners. In one example embodiment, the cumulative utility model may be represented as a cumulative utility curve by plotting the levels of performance and associated cumulative utility values. Similarly, the cumulative cost model may be represented as a cumulative cost curve by plotting the levels of performance and associated cost values.

To further illustrate this aspect of example embodiments of the present invention, again consider the asset having the parameters in the above table 2. In this example, the following positive total utility and negative total utility (cost) values and their respective linked levels of performance may be calculated in accordance with equation (8) as follows:

TABLE 4

| Positive Utility | | | Negative Utility | | |
|---|---|---|---|---|---|
| L | $MU_p$ | $U_p$ | L | $MU_n$ | $U_n$ |
| 1 | 1.07 | 0 | −1 | −0.87 | 0 |
| 10 | 0.66 | 8 | −10 | −0.73 | −7 |
| 20 | 0.53 | 14 | −20 | −0.68 | −14 |
| 30 | 0.46 | 19 | −30 | −0.65 | −21 |
| 40 | 0.40 | 23 | −40 | −0.62 | −27 |
| 50 | 0.36 | 27 | −50 | −0.59 | −33 |
| 60 | 0.32 | 30 | −60 | −0.57 | −39 |
| 70 | 0.28 | 33 | −70 | −0.54 | −45 |
| 80 | 0.24 | 36 | −80 | −0.51 | −50 |
| 90 | 0.20 | 38 | −90 | −0.48 | −55 |
| 99 | 0.12 | 39 | −99 | −0.40 | −59 |

These values, then, may be plotted to form a utility curve (positive value) and cost curve (negative value), as shown in FIG. 9.

As also shown in FIG. 2, the utility/cost distribution module may also include a positive level of performance forecaster (module) 26a configured to forecast or otherwise select a plurality of positive levels of performance (for the utility distribution module 14), or a negative level of performance forecaster (module) 26b configured to forecast or otherwise select a plurality of negative levels of performance (for the cost distribution module 16). These levels of performance may be forecast in a number of different manners. In one example embodiment, the positive and negative levels of performance may be forecast by selecting the levels of performance from respective ones of the aforementioned positive and negative performance potential distributions. In this regard, the levels of performance, and more generally values forecasted or otherwise selected from distributions as described herein, may be forecasted or otherwise selected in any of a number of different manners. For example, these values may be forecasted or otherwise selected according to a method for randomly selecting a value from a distribution, such as the Monte Carlo method for randomly generating values.

In various instances, the positive and negative performance potential distributions may be defined such that it may be possible to select a level of performance outside a permissible range. That is, it may be possible to select from the positive performance potential distribution, a level of performance less than zero or greater than the maximum level of performance. Similarly, it may be possible to select from the negative performance potential distribution, a level of performance less than the minimum level of performance or greater than zero. In such instances, the out-of-bounds level of performance may be reset to the nearest range limit for the respective distribution (e.g., zero or maximum for the positive, or the minimum or zero for the negative).

The utility/cost distribution module of FIG. 2 may also include a cumulative utility determinator (module) 28a (for the utility distribution module 14) or a cumulative cost determinator (module) 28*b* (for the cost distribution module 16). The cumulative utility determinator may be configured to determine cumulative utility values for the forecast positive levels of performance as a function of the model of cumulative utility. Similarly, the cumulative cost determinator may be configured to determine cumulative cost values for the forecast negative levels of performance as a function of the model of cumulative cost. In one example, for each forecast level of performance, the respective cumulative utility/cost may be calculated as the mathematical integral of the marginal utility/cost over the interval from zero to the respective level of performance (or from the respective level of performance to zero), such as in any of the manners described above. This may result in a plurality of forecast positive levels of performance and associated cumulative utility values, and a plurality of negative levels of performance and associated cumulative cost values.

The utility/cost distribution module of FIG. 2 may further include a utility statistics module 30*a* (for the utility distribution module 14) or a cost statistics module 30*b* (for the cost distribution module 16). The utility statistics module may be configured to determine a mean and standard deviation of each of the plurality of cumulative utility (positive utility) values; and similarly, the cost statistics module may be configured to determine a mean and standard deviation of each of the plurality of cumulative cost (negative utility) values. These means and standard deviations, then, may define distributions of contingent future utility and contingent future cost, as determined or otherwise calculated by the utility distribution module 14 and cost distribution module 16 of FIG. 1. The distributions of contingent future utility and cost may be expressed as distributions at the conclusion of a time period from t=0 to t=T; and accordingly, the distributions of contingent future utility and cost may be notationally represented by $\tilde{U}_p$ and $\tilde{U}_n$, respectively. Examples of distributions of contingent future utility and contingent future cost are shown in FIGS. 10 and 11, respectively; and an example of a distribution of contingent future cost overlaying a distribution of contingent future utility is shown in FIG. 12.

Returning to FIG. 1, the system 10 for performing a performance-option valuation may include a payoff determinator (module) 18 configured to determine or otherwise calculate a payoff or performance option value as a function of the distributions. The performance option value may be determined in any of a number of different manners. In one example, the performance option may be determined as the expected value of the difference between the respective present value distributions taking into account the relative probabilities associated with distribution of difference values. In determining the expected value of the difference between the present value distributions, a limit on the minimum permissible difference (minimum predefined value) may be established to take into account those situations that may exist at the time at which the contingent claim is to be exercised which would cause a participant to fail to exercise the contingent claim. In this regard, limiting the minimum permissible difference to zero, for example, may take into account those situations in which the exercise of the contingent claim would otherwise create a loss since a reasonably prudent participant will fail to exercise the contingent claim in these situations. In other situations, the minimum may be set to a value other than zero, or may be variable.

Written notationally, the performance option value may be determined as follows:

$$\text{Performance Option Value} = E[\max(\tilde{U}_p - \tilde{U}_n, 0)] \qquad (10)$$

In equation (10), E represents an expected value (mathematical expectation), i.e., the weighted average of possible values that the respective utility values may take. Accordingly, a performance option may be determined as a function of future utility and cost values $u_p$ and $u_n$ from respective distributions of contingent future utility and cost, such as in accordance with the following:

$$\text{Performance Option Value} = \max(u_p - u_n, 0) \qquad (10a)$$

Also, in equations (10) and (10a), "0" represents a minimum predefined value of zero, although it should be understood that the minimum predefined value may be a number of different values other than zero or may be variable.

The system 10 may further include a performance option valuation module 20 configured to determine or otherwise calculate the mean performance option. For example, the mean performance option Mean Performance Option Value may be determined by selecting or otherwise forecasting a number of (e.g., 10,000) future utility and cost values $s_T$ and $x_T$ from respective distributions of contingent future utility and cost; calculating, for those forecasted utility and cost values, performance option values such as in accordance with equation (10a); and calculating or otherwise determining the mean of the calculated performance option values. These operations may be performed to effectuate equation (10), including its expected value expression.

Even further to calculating the mean, the standard deviation of the calculated performance option values may be calculated or otherwise determined. And from the mean and standard deviation of the performance option values, a performance option distribution may be defined. An example of such a performance option distribution is shown in FIG. 13.

In another exemplary embodiment, the risk-neutral condition may represent a linear relationship between levels of performance and cumulative utility and/or cost. In this exemplary embodiment, the risk-seeking and risk-averse conditions may skew this linear relationship in one direction or another. For example, consider an instance in which a model of cumulative utility/cost for a risk-neutral condition is received, determined or otherwise projected as a plurality of levels of performance and respective utility/cost values. The risk-seeking and risk-averse conditions may be reflected by respective multiplicative factors or coefficients, where each condition may have an associated coefficient at each of a plurality of the levels of performance. Corresponding models of cumulative utility/cost for risk-seeking or risk-averse conditions, then, may be generated by applying their coefficients to the risk-neutral utility/cost values at respective levels of performance.

A system for performing a performance-option valuation according to this other exemplary embodiment may proceed in a manner similar to that described above with respect to FIG. 1, but with some variations. In the parameter acquisition module 12, for example, the parameters selected, determined or otherwise calculated may include, for example, a non-risk-neutral first mean and standard deviation. This first mean and standard deviation may be a risk-seeking first mean $E_{1rs}[X]$ and standard deviation $\text{StdDev}_{1rs}[X]$, or a risk-averse first mean $E_{1ra}[X]$ and standard deviation $\text{StdDev}_{1ra}[X]$. Or in one example, the parameters may include both risk-seeking and risk-averse first means and standard deviations.

Again, utility and cost distribution modules 14, 16 may be configured to determine or otherwise calculate distributions of contingent future utility and cost, respectively. FIG. 14 is a block diagram illustrating various modules of a utility distribution module 14 or cost distribution module 16 (generally the utility/cost distribution module), according to this other example embodiment. This module may include a risk-neutral cumulative utility modeler 32a configured to model or otherwise generate a model of cumulative utility for the risk-neutral condition (for the utility distribution module 14), or a risk-neutral cumulative cost modeler 32b configured to model or otherwise generate a model of cumulative cost for the risk-neutral condition (for the cost distribution module 16). In this exemplary embodiment, cumulative utility and cost need not be modeled as a function of respective marginal utility and cost models; and accordingly, models of marginal utility and cost may not be modeled or otherwise generated (i.e., the utility/cost distribution module need not include a marginal utility module 22a or marginal cost module 22b).

More particularly, according to this other exemplary embodiment, models of cumulative utility and cost may be generated for a risk-neutral condition and/or either or both of a risk-seeking condition or risk-averse condition (non-risk-neutral conditions). In one example, this may include receiving cumulative utility and cost values for a number of levels of performance, and projecting cumulative utility and cost values for any remaining levels of performance in the appropriate range of levels of performance (0→MaxL for utility, or MinL→0 for cost). The projected risk-neutral cumulative utility/cost values may be determined in a number of different manners. In one example in which the levels of performance and utility/cost values are linearly related (y=mx+b), the projected values may be determined according to any of a number of linear or non-linear line or curve-fitting methods. Consider, for example, the following levels of performance, and received and projected risk-neutral cumulative utility values in an instance in which the levels of performance and utility values may have the determined relationship $U_p=1.09L+0$.

TABLE 5

| L | Received $U_p$ | Projected $U_p$ |
|---|---|---|
| 1 | 1.10 | |
| 10 | 12.10 | |
| 20 | 18.60 | |
| 30 | 34.16 | 34.16 |
| 40 | | 43.60 |
| 50 | | 54.50 |
| 60 | | 65.40 |
| 70 | | 76.30 |
| 80 | | 87.20 |
| 90 | | 98.10 |
| 99 | | 107.91 |

A model of risk-neutral cumulative utility including the levels of performance and utility values of table 5 is shown in FIG. 15.

As also shown, the utility/cost distribution module of the example embodiment of FIG. 14 may include a positive non-risk-neutral coefficient determinator (module) 34a (for the utility distribution module 14) or negative non-risk-neutral coefficient determinator (module) 34b (for the cost distribution module 16). The positive and negative non-risk neutral coefficient determinator may be configured to determine or otherwise calculate non-risk-neutral coefficients for each of a plurality of positive and negative levels of performance, respectively. These coefficients may be calculated in a number of different manners, such as in a manner similar to that described above with reference to equations (5)-(9). In one example, the coefficients may be calculated as a function of a lognormal mean and standard deviation. And in this example, a first lognormal mean and standard deviation may be determined for the first lognormal mean and standard deviation, such as in accordance with equations (1) and (2). This first lognormal mean and standard deviation may be a risk-seeking first lognormal mean $\mu_{1rs}$ and standard deviation $\sigma_{1rs}$, or a risk-averse first lognormal mean $\mu_{1ra}$ and standard deviation $\sigma_{1ra}$. Or in one example, the first lognormal mean and standard deviation may include both risk-seeking and risk-averse first lognormal means and standard deviations. Consider, for example, an application in which the first means and standard deviations and their corresponding lognormals may be selected, determined or otherwise calculated as follows:

TABLE 6

| Risk-Seeking | | Risk Averse | |
|---|---|---|---|
| $E_{1rs}[X]$ | 0.0060 | $E_{1ra}[X]$ | 0.0080 |
| $StdDev_{1rs}[X]$ | 0.0050 | $StdDev_{1ra}[X]$ | 0.0010 |
| $\mu_{1rs}$ | −5.38 | $\mu_{1ra}$ | −4.84 |
| $\sigma_{1rs}$ | 0.73 | $\sigma_{1ra}$ | 0.12 |

In one example, the non-risk-neutral coefficients—including risk-seeking coefficients $f_{rs}$ and/or risk-averse coefficients $f_{ra}$—for each level of performance L, may be calculated as a function of the their lognormal means and standard deviations as follows:

$$f_{rs}(L_i) = 1 + \int_0^{L_i} e^{[\mu_{1rs}+\sigma_{1rs}NORMSINV(r'(L))]} dL \text{(risk-seeking)} \quad (11)$$

$$f_{ra}(L_i) = 1 - \int_0^{L_i} e^{[\mu_{1rm}+\sigma_{1rm}NORMSINV(r'(L))]} dL \text{(risk-averse)} \quad (12)$$

In equations (11) and (12), r'(L) in various applications may be set to $r'(L)=(L_i-L_{i-1})/MaxL$, or set to $r'(L)=1-(L_i-L_{i-1})/MaxL$. For the same application, the r'(L) expression may be the same or different for the risk-seeking and risk-neutral conditions. It should also be understood that the integration may be carried out in a number of different manners, such as according to the composite algorithm or a pseudo-algorithm in a manner similar to that explained above.

The utility/cost distribution module of the example embodiment of FIG. 14 may include a non-risk-neutral cumulative utility modeler (module) 36a (for the utility distribution module 14) or non-risk-neutral cumulative utility modeler (module) 36b (for the cost distribution module 16). The non-risk-neutral cumulative utility and cost modelers may be configured to generate models of cumulative utility and cost, respectively, for the non-risk-neutral condition(s). In accordance with one exemplary embodiment, the cumulative utility and cost values of the models may be generated by multiplying the risk-neutral cumulative utility and cost values of their models by respective non-risk-neutral coefficients. In one example, the non-risk-neutral cumulative utility values—including risk-seeking values $U_{prs}$ and/or risk-averse values $U_{pra}$—for each level of performance L, may be calculated as follows:

$$U_{prs}(L_i)=f_{rs}(L_i)\times U_p(L_i) \quad (13)$$

$$U_{pra}(L_i)=f_{ra}(L_i)\times U_p(L_i) \quad (14)$$

Continuing the example of tables 5 and 6, coefficients and cumulative utility values for the risk-seeking and risk-averse models may be calculated as follows (not including values for the actual, received cumulative utility values—although these may also be calculated):

TABLE 7

| L | Risk Neutral $U_p$ | Risk Seeking | | Risk Averse | |
|---|---|---|---|---|---|
| | | $f_{rs}$ | $U_{prs}$ | $f_{ra}$ | $U_{pra}$ |
| ... | ... | ... | ... | ... | ... |
| 30 | 34.16 | 1.00 | 34.16 | 1.00 | 34.16 |
| 40 | 43.60 | 1.16 | 50.56 | 0.90 | 39.33 |
| 50 | 54.50 | 1.26 | 68.50 | 0.81 | 44.25 |
| 60 | 65.40 | 1.33 | 87.08 | 0.73 | 47.47 |
| 70 | 76.30 | 1.39 | 106.21 | 0.64 | 49.03 |
| 80 | 87.20 | 1.44 | 125.75 | 0.56 | 49.02 |
| 90 | 98.10 | 1.48 | 145.57 | 0.48 | 47.49 |
| 99 | 107.91 | 1.52 | 163.51 | 0.42 | 44.89 |

Models of risk-neutral cumulative utility, risk-seeking cumulative utility and risk-averse cumulative utility including the levels of performance and utility values of table 7 are shown in FIG. 16.

The utility/cost distribution module of the example embodiment of FIG. 14 may further include a positive/negative level of performance forecaster 26a, 26b, a cumulative utility/cost determinator 28a, 28b and utility/cost statistics module 30a, 30b similar to the utility/cost distribution module of the example embodiment of FIG. 2, but that function for the respective risk conditions. Returning to FIG. 1, the system of performing a performance-option valuation according to this other exemplary embodiment may similarly include a payoff determinator 18 and performance option valuation module 20 similar to that described above to thereby determine a performance option value for the risk-neutral condition and/or either or both of the risk-seeking or risk-averse conditions.

FIGS. 1, 2, 3a and 3b illustrate block diagrams of example apparatuses, methods and/or computer program products according to example embodiments. It will be understood that each module of the block diagrams, and/or combinations of modules in the block diagrams, can be implemented by various means. Means for implementing the modules of the block diagrams, combinations of the modules in the block diagrams, or other functionality of example embodiments described herein may include hardware, and/or a computer program product including a computer-readable storage medium (as opposed to a computer-readable transmission medium which describes a propagating signal) having one or more computer program code instructions, program instructions or executable computer-readable program code instructions stored therein. In this regard, program code instructions for carrying out the operations and functions of the modules of FIGS. 1, 2, 3a and 3b and otherwise described herein may be stored in the memory device of an example apparatus, and executed by a processor. As will be appreciated, any such program code instructions may be loaded onto a computer or other programmable apparatus (e.g., processor, memory device or the like) from a computer-readable storage medium to produce a particular machine, such that the particular machine becomes a means for implementing the functions specified in the block diagrams' modules.

These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the block diagrams' modules. The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded and/or executed together. Execution of the program code instructions may produce a computer-implemented process such that the instructions executed by the computer, processor or other programmable apparatus provide operations for implementing the functions specified in the block diagrams' modules.

Accordingly, execution of instructions associated with the operations of the modules of the block diagrams by a processor, or storage of instructions associated with the modules of the block diagrams in a computer-readable storage medium, supports combinations of operations for performing the specified functions. It will also be understood that one or more modules of the block diagrams, and combinations of modules in the block diagrams, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A system for performing a performance-option valuation, the system including a plurality of modules configured to perform a plurality of operations, the modules and operations comprising:

a utility distribution module configured to determine a present value distribution of contingent future positive utility attributable to making a resource commitment to a particular asset at a subsequent time, the present value distribution of contingent future positive utility being determined based upon first parameters that reflect risk in the positive utility, the present value distribution of contingent future positive utility assigning a respective probability to each of a plurality of different total positive utility values, each total positive utility value reflecting a benefit gained by the particular asset achieving a certain level of performance;

a cost distribution module configured to determine a present value of a contingent future negative utility required to make the resource commitment at the subsequent time or deviate from a resource commitment to a known alternative asset, the present value of the contingent future negative utility being determined based upon second parameters that reflect risk in the negative utility, the present value of the contingent future negative utility reflecting a cost incurred by the particular asset achieving the certain level of performance, or reflecting the benefit gained from the known alternative asset; and a payoff determinator or performance option valuation module configured to determine a value of an option to make the resource commitment as a function of the present value distribution of contingent future positive utility and the present value of the contingent future negative utility, wherein the modules are implemented by one or more apparatuses including one or more processors and one or more memories storing executable instructions that in response to execution by the one or more processors cause the one or more apparatuses to perform the operations of the modules.

2. The system of claim 1, wherein the first parameters and second parameters each include a respective mean and standard deviation, and wherein at least one of the first parameters is different from a corresponding one of the second parameters.

3. The system of claim 1, wherein the utility distribution module further comprises:
a cumulative utility modeler configured to generate a model of total utility that assigns a respective total positive utility value to each of a plurality of levels of performance; and
a utility statistics module configured to determine the present value distribution of contingent future positive utility based upon the model of total utility.

4. The system of claim 3, wherein the utility distribution module comprises further comprises:
a positive level of performance forecaster configured to forecast a plurality of levels of performance; and
a cumulative utility determinator configured to identify, from the model, a plurality of total positive utility values associated with the respective forecasted plurality of levels of performance, and
wherein the utility statistics module is configured to determine a mean and a standard deviation of the identified plurality of total positive utility values, the present value distribution of contingent future positive utility being determined based upon the mean and standard deviation.

5. The system of claim 3, wherein the utility distribution module further comprises:
a marginal utility module configured to generate a model of marginal utility that assigns a respective marginal positive utility value to each of the plurality of levels of performance, each marginal positive utility value reflecting a benefit gained by an asset achieving an increase from one level of performance to a next level of performance,
wherein the cumulative utility modeler is configured to integrate the model of marginal utility to thereby generate the model of total utility.

6. The system of claim 3, wherein the utility distribution module further comprises:
a risk-neutral cumulative utility modeler configured to generate a risk-neutral model of total utility that assigns a respective risk-neutral total positive utility value to each of the plurality of levels of performance for a risk-neutral condition; and a non-risk-neutral cumulative utility modeler configured to generate a non-risk-neutral model of total utility based upon the risk-neutral model of total utility and the first parameters that reflect a non-risk-neutral condition, the non-risk-neutral model of total utility assigning a respective non-risk-neutral total positive utility value to each of the plurality of levels of performance, wherein the utility statistics module is configured to determine the present value distribution of contingent future positive utility based upon the non-risk-neutral model of total utility.

7. The system of claim 6, wherein the utility distribution module further comprises:
a positive non-risk-neutral coefficient determinator configured to determine a coefficient for each respective risk-neutral total positive utility value based upon the first parameters and the level of performance to which the risk-neutral total positive utility value is assigned,
wherein the non-risk-neutral cumulative utility modeler is configured to determine each non-risk-neutral total positive utility value based upon the respective coefficient and risk-neutral total positive utility value assigned to a level of performance that is the same as the respective non-risk-neutral total positive utility value.

8. The system of claim 1, wherein the cost distribution module is configured to determine a present value distribution of contingent future negative utility, and
wherein the payoff determinator or performance option valuation module is configured to select the present value of a contingent future negative utility from the present value distribution of contingent future negative utility.

9. The system of claim 1, wherein system includes the performance option valuation module, the performance option valuation module being configured to determine an average of the difference between the present value distribution of contingent future positive utility and the present value of the contingent future negative utility.

10. A method of performing a performance-option valuation, the method comprising:
determining a present value distribution of contingent future positive utility attributable to making a resource commitment to a particular asset at a subsequent time, the present value distribution of contingent future positive utility being determined based upon first parameters that reflect risk in the positive utility, the present value distribution of contingent future positive utility assigning a respective probability to each of a plurality of different total positive utility values, each total positive utility value reflecting a benefit gained by the particular asset achieving a certain level of performance;
determining a present value of a contingent future negative utility required to make the resource commitment at the subsequent time or deviate from a resource commitment to a known alternative asset, the present value of the contingent future negative utility being determined based upon second parameters that reflect risk in the negative utility, the present value of the contingent future negative utility reflecting a cost incurred by the particular asset achieving the certain level of performance, or reflecting the benefit gained from the known alternative asset; and
determining a value of an option to make the resource commitment as a function of the present value distribution of contingent future positive utility and the present value of the contingent future negative utility, wherein the present value distribution of contingent future positive utility, determining the present value of a contingent future negative utility and determining the value of the option are performed by an apparatus including a processor and a memory storing executable instructions that in response to execution by the processor cause the apparatus to at least determine the present value distribution of contingent future positive utility, determine the present value of a contingent future negative utility and determine the value of the option.

11. The method of claim 10, wherein the first parameters and second parameters each include a respective mean and standard deviation, and wherein at least one of the first parameters is different from a corresponding one of the second parameters.

12. The method of claim 10, wherein determining the present value distribution of contingent future positive utility further includes:
generating a model of total utility that assigns a respective total positive utility value to each of a plurality of levels of performance; and
determining the present value distribution of contingent future positive utility based upon the model of total utility.

13. The method of claim 12, wherein determining the present value distribution of contingent future positive utility further includes:
forecasting a plurality of levels of performance, and from the model, identifying a plurality of total positive utility values associated with the respective forecasted plurality of levels of performance; and
determining a mean and a standard deviation of the identified plurality of total positive utility values,
wherein the present value distribution of contingent future positive utility is determined based upon the mean and standard deviation.

14. The method of claim 12, wherein generating the model of total utility includes:
generating a model of marginal utility that assigns a respective marginal positive utility value to each of the plurality of levels of performance, each marginal positive utility value reflecting a benefit gained by an asset achieving an increase from one level of performance to a next level of performance; and
integrating the model of marginal utility to thereby generate the model of total utility.

15. The method of claim 12, wherein generating the model of total utility includes:
generating a risk-neutral model of total utility that assigns a respective risk-neutral total positive utility value to each of the plurality of levels of performance for a risk-neutral condition;
generating a non-risk-neutral model of total utility based upon the risk-neutral model of total utility and the first parameters that reflect a non-risk-neutral condition, the non-risk-neutral model of total utility assigning a respective non-risk-neutral total positive utility value to each of the plurality of levels of performance; and
determining the present value distribution of contingent future positive utility based upon the non-risk-neutral model of total utility.

16. The method of claim 15, wherein generating the non-risk-neutral model of total utility includes:
determining a coefficient for each respective risk-neutral total positive utility value based upon the first parameters and the level of performance to which the risk-neutral total positive utility value is assigned; and
determining each non-risk-neutral total positive utility value based upon the respective coefficient and risk-neutral total positive utility value assigned to a level of performance that is the same as the respective non-risk-neutral total positive utility value.

17. The method of claim 10, wherein determining the present value of the contingent future negative utility includes:
determining a present value distribution of contingent future negative utility; and
selecting the present value of a contingent future negative utility from the present value distribution of contingent future negative utility.

18. The method of claim 10, wherein determining the value of the option includes determining an average of the difference between the present value distribution of contingent future positive utility and the present value of the contingent future negative utility.

19. A computer-readable storage medium for performing a performance-option valuation, the computer-readable storage medium having computer-readable program code portions stored therein that in response to execution by a processor cause an apparatus to at least:
determine a present value distribution of contingent future positive utility attributable to making a resource commitment to a particular asset at a subsequent time, the present value distribution of contingent future positive utility being determined based upon first parameters that reflect risk in the positive utility, the present value distribution of contingent future positive utility assigning a respective probability to each of a plurality of different total positive utility values, each total positive utility value reflecting a benefit gained by the particular asset achieving a certain level of performance;
determine a present value of a contingent future negative utility required to make the resource commitment at the subsequent time or deviate from a resource commitment to a known alternative asset, the present value of the contingent future negative utility being determined based upon second parameters that reflect risk in the negative utility, the present value of the contingent future negative utility reflecting a cost incurred by the particular asset achieving the certain level of performance, or reflecting the benefit gained from the known alternative asset; and
determine a value of an option to make the resource commitment as a function of the present value distribution of contingent future positive utility and the present value of the contingent future negative utility.

20. The computer-readable storage medium of claim 19, wherein the first parameters and second parameters each include a respective mean and standard deviation, and wherein at least one of the first parameters is different from a corresponding one of the second parameters.

21. The computer-readable storage medium of claim 19, wherein the apparatus being caused to determine the present value distribution of contingent future positive utility further includes being caused to:
generate a model of total utility that assigns a respective total positive utility value to each of a plurality of levels of performance; and
determine the present value distribution of contingent future positive utility based upon the model of total utility.

22. The computer-readable storage medium of claim 21, wherein the apparatus being caused to determine the present value distribution of contingent future positive utility further includes being caused to:
forecast a plurality of levels of performance, and from the model, identifying a plurality of total positive utility values associated with the respective forecasted plurality of levels of performance; and
determine a mean and a standard deviation of the identified plurality of total positive utility values,
wherein the present value distribution of contingent future positive utility is determined based upon the mean and standard deviation.

23. The computer-readable storage medium of claim 21, wherein the apparatus being caused to generate the model of total utility includes being caused to:
generate a model of marginal utility that assigns a respective marginal positive utility value to each of the plurality of levels of performance, each marginal positive utility value reflecting a benefit gained by an asset achieving an increase from one level of performance to a next level of performance; and
integrate the model of marginal utility to thereby generate the model of total utility.

24. The computer-readable storage medium of claim 21, wherein the apparatus being caused to generate the model of total utility includes being caused to:
generate a risk-neutral model of total utility that assigns a respective risk-neutral total positive utility value to each of the plurality of levels of performance for a risk-neutral condition;
generate a non-risk-neutral model of total utility based upon the risk-neutral model of total utility and the first parameters that reflect a non-risk-neutral condition, the non-risk-neutral model of total utility assigning a respective non-risk-neutral total positive utility value to each of the plurality of levels of performance; and
determine the present value distribution of contingent future positive utility based upon the non-risk-neutral model of total utility.

25. The computer-readable storage medium of claim 24, wherein the apparatus being caused to generate the non-risk-neutral model of total utility includes being caused to:
determine a coefficient for each respective risk-neutral total positive utility value based upon the first parameters and the level of performance to which the risk-neutral total positive utility value is assigned; and
determine each non-risk-neutral total positive utility value based upon the respective coefficient and risk-neutral total positive utility value assigned to a level of performance that is the same as the respective non-risk-neutral total positive utility value.

26. The computer-readable storage medium of claim 19, wherein the apparatus being caused to determine the present value of the contingent future negative utility includes being caused to:
determine a present value distribution of contingent future negative utility; and
select the present value of a contingent future negative utility from the present value distribution of contingent future negative utility.

27. The computer-readable storage medium of claim 19, wherein the apparatus being caused to determine the value of the option includes being caused to determine an average of the difference between the present value distribution of contingent future positive utility and the present value of the contingent future negative utility.

\* \* \* \* \*